US010804736B2

(12) United States Patent
Sun et al.

(10) Patent No.: US 10,804,736 B2
(45) Date of Patent: Oct. 13, 2020

(54) METHODS AND SYSTEMS FOR POST-DISASTER RESILIENT RESTORATION OF POWER DISTRIBUTION SYSTEM

(71) Applicant: Mitsubishi Electric Research Laboratories, Inc., Cambridge, MA (US)

(72) Inventors: Hongbo Sun, Lexington, MA (US); Shiva Poudel, Pullman, WA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 78 days.

(21) Appl. No.: 16/188,967

(22) Filed: Nov. 13, 2018

(65) Prior Publication Data
US 2020/0153273 A1    May 14, 2020

(51) Int. Cl.
*H02J 13/00* (2006.01)
*G05B 17/02* (2006.01)
*H02J 3/00* (2006.01)

(52) U.S. Cl.
CPC .......... *H02J 13/0006* (2013.01); *G05B 17/02* (2013.01); *H02J 3/00* (2013.01); *H02J 2203/20* (2020.01)

(58) Field of Classification Search
None
See application file for complete search history.

(56) References Cited

U.S. PATENT DOCUMENTS

| | | | | |
|---|---|---|---|---|
| 9,026,260 | B1* | 5/2015 | Thornley | H02J 3/14 700/292 |
| 2015/0054339 | A1* | 2/2015 | Zhao | H02J 3/386 307/24 |
| 2014/0039802 | A1 | 12/2015 | Siemens | |

(Continued)

OTHER PUBLICATIONS

Microgrid Black-Start After Natural Disaster with Load Restoration Using Spanning Tree Search ( a Non Patent Literature, Author's: Zhenyu Tan, Rui Fan, Yu Liu, Liangyi Sun, Publication Date: Not Available).

(Continued)

*Primary Examiner* — Ryan A Jarrett
(74) *Attorney, Agent, or Firm* — Gennadiy Vinokur; James McAleenan; Hironori Tsukamoto

(57) ABSTRACT

Systems and methods for configuring micro-grids to restore some power in a power distribution grid (PDG) in response to a power disruption over the PDG. A computing system configured to receive current condition information from devices in the PDG. Form a minimum spanning forest (MSF) to identify a set of micro-grids, each spanning tree in a forest is a self-sustained islanded micro-grid network. Assign a ranking to each inter-bus link within each micro-grid according to constraints, to identify some inter-bus links above a high-ranking threshold to be switched off during a restoration period. Identify switches that restore power to some critical loads of a subset of critical loads with different forest configurations, based on buses that are switched on, to determine a subset of micro-grids less susceptible for link failures during the restoration period. Upon receiving a power disruption, activate the switches to restore some power to the PDG.

25 Claims, 15 Drawing Sheets

(56) References Cited

U.S. PATENT DOCUMENTS

2018/0316184 A1    11/2018  Hong et al.
2018/0316188 A1*   11/2018  Ishchenko ................ H02H 7/28
2019/0027960 A1*   1/2019   Agrawal ................. H02J 3/383

OTHER PUBLICATIONS

Mukherjee et al., "Distributed Generator Sizing of Joint Optimization of Resilience and Voltage Regulation," 2018 North American Power Symposium. IEEE, Sep. 9, 2018, pp. 1-6.

* cited by examiner

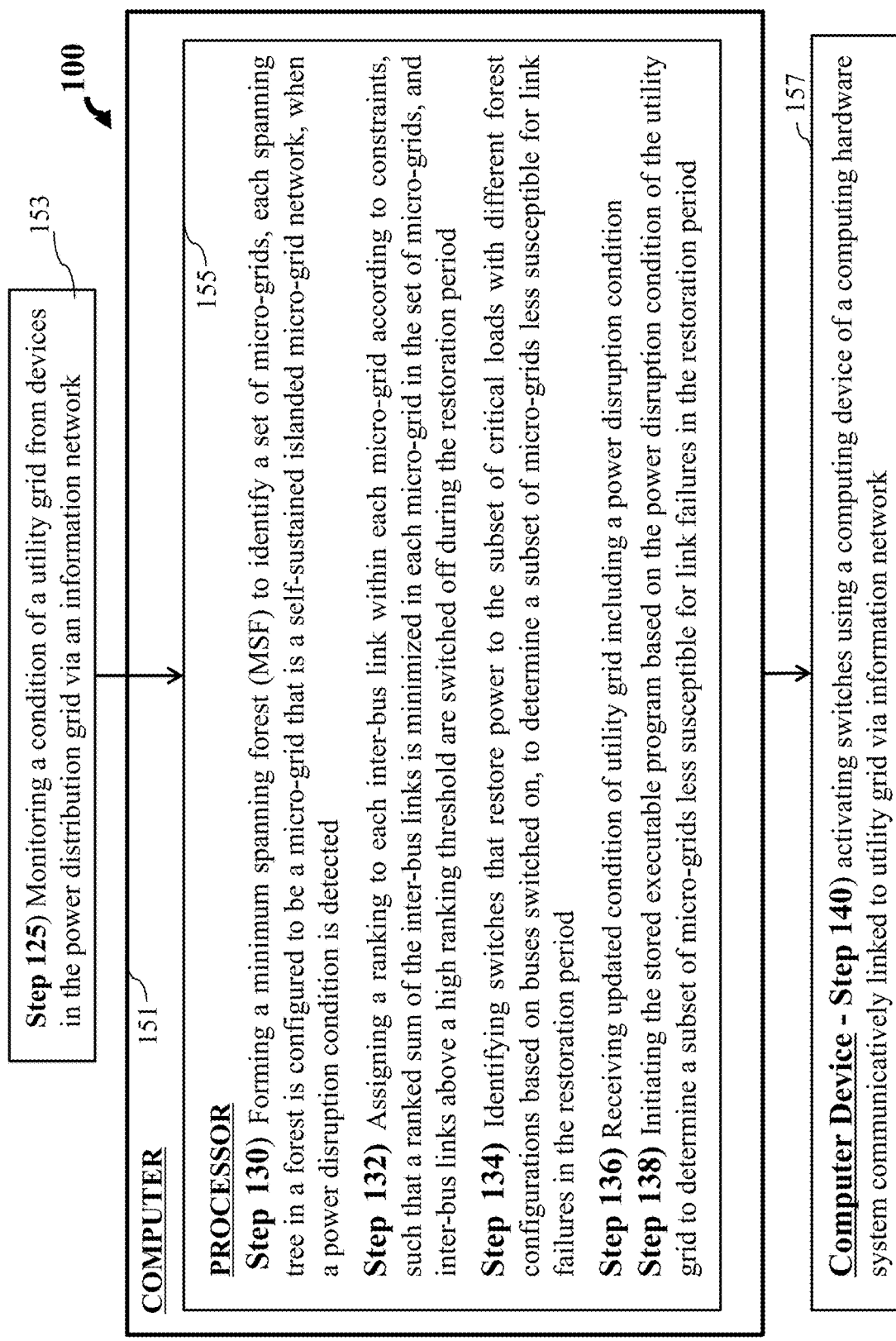

METHODS AND SYSTEMS FOR POST-DISASTER RESILIENT RESTORATION OF POWER DISTRIBUTION SYSTEM

FIELD

The present disclosure relates generally to electric power systems, and more particularly to post-disaster resilient restoration of power distribution system.

BACKGROUND

Electric power grids are one of the most critical infrastructures to today societies, for example transportation, water supply, school, city halls, and airports all rely on the supply of electricity. Unfortunately, the increased frequency, duration, and intensity of extreme weather events pose severe threats to the power grid causing wide-area power outages primarily affecting in low-voltage and mid-voltage power distribution grid that contributes to majorities of the outages. Although weather-related power outages in the power grid have not been frequent, over the last few years, power outages are substantially increasing and their consequences are staggering. For example, in the United States in August and September of 2017, experienced 3 separate hurricanes Harvey, Irma and Maria hit, that resulted in a total of about 7.5 million customers in Texas and Florida without electricity. The staggering cost of power system outages and the impacts on personal safety has resulted in a critical need to build resilience in power systems, specifically in view of today's aging and stressed power distribution grids.

With these considerations, planning models combining the use of advanced technologies like distributed generations and microgrids, increasing redundancy, hardening the existing components, and an addition of remote-controlled switches have been adopted for resilient upgrades of the electric distribution grid. Although these smart and optimal designs for a resilient power grid help to maintain the standard of service, the outage in distribution networks is inevitable. Thus, it is always an open and interesting topic to study how well to utilize the available resources during the disaster period to achieve a certain level of resilience. Note that, conventional restoration strategies are not applicable for disaster scenarios because they only consider typical outages and assume distribution and transmission network are intact. However, multiple faults, a large outage area affecting a large number of customers, lack of available power sources, and fragmented distribution network are not uncommon in a catastrophic outage.

Some efforts have been made to address power distribution system restoration. For example, U.S. Pat. No. 5,973,899 A discloses a feeder restoration method for responding to an overcurrent fault on a feeder that causes a circuit breaker to trip open, reclose once, trip again, and attempt to reclose again. During the time period between the first and second reclosing, any remote sectionalizing switches on the faulty feeder are opened if they have also sensed the overcurrent fault, and a substation processor evaluates the status of the faulty feeder and an alternate feeder. After the second trip of the circuit breaker, the processor verifies whether the remote sectionalizing switch was closed and a remote tie switch to the alternate feeder was open. If the circuit breaker locks open, the substation processor determines whether the remote sectionalizing switch did not sense the overcurrent condition or simply failed to open. The processor then verifies that the remote sectionalizing switch voltage is zero and opens the switch. The processor next determines whether the alternate feeder and its associated transformer and circuit breaker can pick up the dropped load, and if they can, the substation processor modifies the alternate circuit breaker trip current settings to accommodate the new total load plus a surge current and closes the remote tie switch to transfer the load to the alternate feeder.

However, conventional resilient restoration approaches have many limitations. First, some approaches based on search or other heuristics, do not provide mathematical insights and also are very time-consuming, which make them unequiped to address today's power restoration needs. Second, other conventional approaches use programming based on per-phase analysis which are not applicable for practical distribution feeders. Third, some conventional resilient restoration approaches fail to prove the physical survivability of the islanded grid in the post-restorative state until after the infrastructures are fully recovered.

Accordingly, there is need to for more advanced and implementable methods for post-disaster restoration of power distribution system.

SUMMARY

The present disclosure relates to electric power systems, and more particularly to post-disaster resilient restoration of power distribution system.

The present disclosure relates to systems and methods for resilient restoration of disaster-impacted distribution networks directed to restoring critical loads. At least one realization of the present disclosure included that distributed generation managed by microgrids can be considered an effective and reliable way to continue supplying critical loads in such a scenario, and the grid resilience can be improved with distributed generators by circuit reconfiguration using remote-controlled switches.

Another realization of the present disclosure regarding restoring critical loads, can be in part, by utilizing the concept of minimum spanning forest (MSF) to formulate the power restoration problem, where each spanning tree in a forest is a self-sustained islanded grid (SSIG). Specifically, a weight is assigned to each edge (inter-bus link) in a distribution system based on several factors such as their exposure to vegetation, span length, location and structures supporting them. Then, an MSF is obtained for the given network by switching off the edges with higher weights to form several SSIGs, wherein each is energized by a microturbine (DG) and other energy systems (DGs) (i.e. renewable & energy storage systems), while achieving resilience objectives.

Thus, concept of MSF can be realized by the switching off of the edges with the higher weight during the restoration process such that the probability of link failure is reduced. The modeling of tie switches helps to achieve the same objective of restoring the critical loads with different forest configuration, thus making the SSIG less susceptible for link failures in the post-restorative state before the system enters the infrastructure recovery stage. Which can result in network performance in a post-disaster period that be significantly enhanced by optimally placing tie switches and locally available distributed generators (DGs) with energy storage system (ESS).

At least one initial objective function of resilient restoration systems and methods of the present disclosure can be to restore maximum critical loads, and restore fewer non-critical loads, using DGs, until the main power grid is back. Further, at least one secondary objective function can be that different SSIGs can be formed by switching the edges with higher weights to get minimum spanning forest (MSF), so as to achieve resilience objectives. Further still, at least one overall objective function can be a combination of initial and secondary objectives with proper value of weight selected to ensure that the secondary objective is considered, only when the initial objective values are the same.

Some embodiments of the present disclosure include systems and methods for modeling tie switches and their effects on forming the MSF effectively in a problem formulation of an unbalanced three-phase distribution network. The uncertain behavior of load consumption and power output from intermittent DGs can also be modeled for providing a solution in a given optimization horizon. By transforming a combinatorial problem of path search into a mixed-integer linear program (MILP) problem, the restoration problem can be efficiently and quickly solved by off-the-shelf solvers.

The present disclosure understands the importance of resilient restoration of critical loads during catastrophic events to ensure important infrastructure operations and services are provided. When a main grid is not available due to an disaster related event, locally available distributed generators can be utilized, to provide power to critical loads to reduce the social impact in a community, because of a prolonged outage by supporting critical services until the utility is back operational. Thus, aspects of the present disclosure provide for an optimal and robust approach to restore the critical loads in aftermath of a natural disaster. As such, the present disclosure uses the concept of MSF to formulate the restoration problem, where each spanning tree in a forest is SSIG. Specifically, as noted above, a weight is assigned to each edge in a distribution system based on several factors such as their exposure to vegetation, span length, location and structures supporting them. Then, an MSF is obtained for the given network by switching off the edges with higher weights to form several SSIGs each energized by a master unit, i.e. micro-turbine in coordination with several intermittent DGs and ESS, while achieving the resilience objectives.

During experimentation, at least one approach included using a base network connected to the power system, wherein the power system included an intelligent electronic device associated with each of the switching devices to control the opening/closing of the switching devices. A base network state was defined, and a power restoration logic created for the base network state. Wherein, a simulation was run for the power restoration logic, and that the power restoration logic was transmitted to a power restoration controller, such that the power restoration controller was configured to thereafter monitor & control the intelligent electronic devices during test events. However, what was learned from this experimentation is that the opening and closing of switches didn't address the issue of resiliency, or physical survivability of an islanded grid in a post-restorative state, among other things. Also, this type of approach, and other similar experimented approaches, all proved to be very time consuming to implement, which made such approaches not practical for use in view obtaining today's resilient restoration requirements. Hence, such approach or like approaches were not further experimented with due to not meeting the goals of the present disclosure.

In addressing aspects in solving the resilient restoration for a power distribution system, the power distribution is examined in more details on disaster impacts, network connectivity, inter-bus link vulnerability, switch operation, and generation mix.

A major disaster can cause multiple line outages simultaneously, and sometimes even a blackout of main substations. If a particular substation is at fault, or fails, customers fed by a feeder of that substation will be deprived of their normal power supply. In addition, several distribution lines are also likely to have failed or at fault.

The distribution power system can consist of dispatchable DGs such as microturbines (MTs) that can be scheduled to provide varying real and reactive power demand from critical resources while maintaining the frequency and voltage of the restored network. It is assumed that distribution circuit can be equipped with enough remote controlled sectionalizing and tie switches for enhancing the restorability. Despite open-loop configurations arising from tie-switches, radial topology is maintained in the restored circuits, implying each MT acts as a source to only one SSIG. Specifically, this means no SSIGs are networked in the restoration process.

There are different states of a power distribution system experienced during a disaster. For example, there is the operational resilience state that can include a resilient state, event in progress state that includes a post event degraded state, a restorative state, and a post restoration state. By non-limiting example, the restorative state and the post restorative state of the operational resilience state is a time frame the methods and systems can be utilized, however, other states of with the disaster may also be considered. The power distribution system can undergo through the degraded and restorative state before the utility can come back online, and infrastructure recovery has been completed. By non-limiting example, during this particular time frame, i.e. restorative state and the post restorative state, some restorative actions can be implemented by the utility and the utility crew members, such that power distribution system gradually move from a degraded to restorative state. Some restorative actions can be completed at the end of the restorative state, where the power distribution system can reach a higher level of performance, which is termed as post-restoration state that may have reached a specific resiliency level. It is important to note that, based on a severity of the disaster event, infrastructure may take a longer time to fully recover and hence achieving the original resiliency may not be possible at the end of post-restoration state. Thus, the power distribution system remains on the post-restoration state where several islands or isolated systems are formed as per some of the systems and methods of the present disclosure that can include a restoration algorithm, until the normal power from the utility comes back. Often, during an outage caused by extreme events, it can take several days, sometimes even weeks and months, to access normal power from the utility. A recent example is an outage in Puerto Rico where strong winds and tree branches damaged power lines, transmission towers and substations that were already weakened by hurricane Irma less than two weeks before the strike of hurricane Maria and the result was a complete blackout.

Thus, according to aspects of the present disclosure it is important to ensure that the restoration solutions do not fail in the aftermath of the disaster before the main grid comes back. At least one key approach to restoring the loads after a natural disaster, among many key approaches of the present disclosure, is to use local DGs by incorporating a suitable islanding scheme or schemes. With this in mind, aspects of the present disclosure provide resilient restoration strategies to restore maximum possible critical loads by forming a MSF from the available DGs in the network.

According to some aspects of the present disclosure, the power distribution system can be modeled with set of buses or nodes and set of edges. The restoration of distribution system can be viewed as splitting a graph into self-adequate sub-areas which are referred as 'Self-Sustained Islanded Grid'. Each SSIG is energized by a single MT and other non-dispatchable DGs, wherein no MTs are networked in the restoration process. The statues or states of nodes and edges can be represented by corresponding binary variables accordingly. Therefore, the power restoration can be modeled as a constrained optimization problem, e.g. a mixed integer linear programming problem (MILP) to be solved.

For example, each node, can have a binary variable to represent its energizing state. Since MTs are not networked during the restoration process, each node can belong to only one SSIG. A binary variable $v_i=\{0,1\}$ is assigned to node i, and $v_i=1$ implies that node i belongs to one of the SSIGs while $v_i=0$ implies node i is not energized during the restoration process.

For each node, some aspects of the present disclosure also have a binary variable to represent a pick-up state for its load. In a disaster condition, it is not possible to pick up all the loads in the outage area. Thus, a load with lower priority needs to be switched off while supplying a higher priority load. A binary variable $s_i=\{0,1\}$ is assigned to each of node, where $s_i=1$ implies that load connected to node i is picked up and vice-versa. Note that for a load to be picked up both $v_i$ and $s_i$ should pick a value of 1. For each line and MT switch, a binary variable is used to represent its status. Although loop configuration resulting from the combination of tie switches and sectionalizing switches leads to several possible paths to supply the loads, it is necessary that the restored network operate in radial topology, thus necessitating a decision, upon which switches to open, or close, for executing the restoration process. A binary variable $\delta_{ij}=\{0, 1\}$ is assigned to each of the sectionalizing and tie switches, where $\delta_{ij}=1$ implies that switch joining nodes i and j is closed and vice-versa. Similarly, a dispatchable DG i.e., a MT is modeled as a virtual switch in the disclosed framework and a binary variable $\delta_{ij}=\{0, 1\}$ is assigned to each MT switch where $\delta_{ij}=1$ implies that MT is connected to node j and virtual switch between substation node i and MT-node j is closed. The MT is ready to inject power $P_{MT}$ and $Q_{MT}$ to node j, when its decision variable is set to be 1.

Aspects of embodiments of present disclosure provide contributions and benefits in addressing the resilience restoration challenges during a disaster period of a power distribution system. For example, some aspects include: utilizing the concept of minimum spanning forest (MSF) to formulate a power restoration problem; modeling tie switches that are effectively modeled in the problem formulation of an unbalanced three-phase distribution network, along with their effects on forming the MSF; modeling uncertain behavior of load consumption and power output from intermittent DGs associated with providing a solution in a given optimization horizon; and also providing a mixed-integer linear program (MILP) based on transforming a combinatorial problem of path search, among many other aspects.

According to an embodiment of the present disclosure, a system for configuring micro-grids to restore some power in a power distribution grid (PDG) in response to a power disruption over the PDG. The PDG includes power sources and a set of loads connected to buses, such that the set of loads includes a subset of critical loads and a subset of non-critical loads, and that the micro-grids are structured to be unnetworked during a restoration period. The system comprising a computing hardware system comprising one or more computing devices communicatively linked to the PDG via an information network. Wherein the one or more computing devices are configured to receive current condition information from devices in the PDG via the information network. Form a minimum spanning forest (MSF) to identify a set of micro-grids, wherein each spanning tree in a forest is configured to be a micro-grid that is a self-sustained islanded micro-grid (SSIMG) network. Assign a ranking to each inter-bus link within each micro-grid according to one or more constraints, to identify some inter-bus links above a high-ranking threshold to be switched off during the restoration period. Identify switches that restore power to some critical loads of the subset of critical loads with different forest configurations, based on buses that are switched on, to determine a subset of micro-grids less susceptible for link failures during the restoration period. Upon receiving an updated condition from the devices, activate the switches to restore some power to the PDG.

According to another embodiment of the present disclosure, a method for configuring micro-grids in an electrical distribution grid (EDG), to restore some power in the EDG in response to a power disruption over the EDG. The EDG includes a plurality of power sources and a set of loads connected to buses, such that the set of loads includes a subset of critical loads and a subset of non-critical loads, and that the micro-grids are structured to be unnetworked during a restoration period. The method comprising providing a computer infrastructure, operable to subscribe to devices registered with a network server corresponding to the EDG. Receive current condition information published in messages by the devices via the network server. Determine whether a power disruption is present in the EDG, if the power disruption is determined, then access an executable program from a hardware memory that includes program instructions and historical data. The executable program is configured to form a minimum spanning forest (MSF) to identify a set of micro-grids. Assign a ranking to each inter-bus link within each micro-grid according to one or more constraints. Wherein inter-bus links above a high ranking threshold are switched off during the restoration period. Identify switches that restore power to some critical loads of the subset of critical loads with different forest configurations, based on buses that are switched on, to determine a subset of micro-grids. Transmit messages to the identified switches to restore power to some of the critical loads.

According to another embodiment of the present disclosure, a computer program product for configuring micro-grids. The computer program product comprising one or more computer-readable storage mediums. Program instructions, stored on at least one of the one or more computer-readable storage mediums, to electrically isolate one or more premises into a micro-grid within a power distribution grid. Program instructions, stored on at least one of the one or more computer-readable storage mediums, to subscribe to devices in a local region network of the one or more premises. Program instructions, stored on at least one of the one or more computer-readable storage mediums, to modify power flow in the micro-grid based on current condition information identifying a power disruption provided from the devices via the local region network.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1A is a block diagram illustrating a method for restoring power in a power distribution network, according to embodiments of the present disclosure;

Figure 1B:
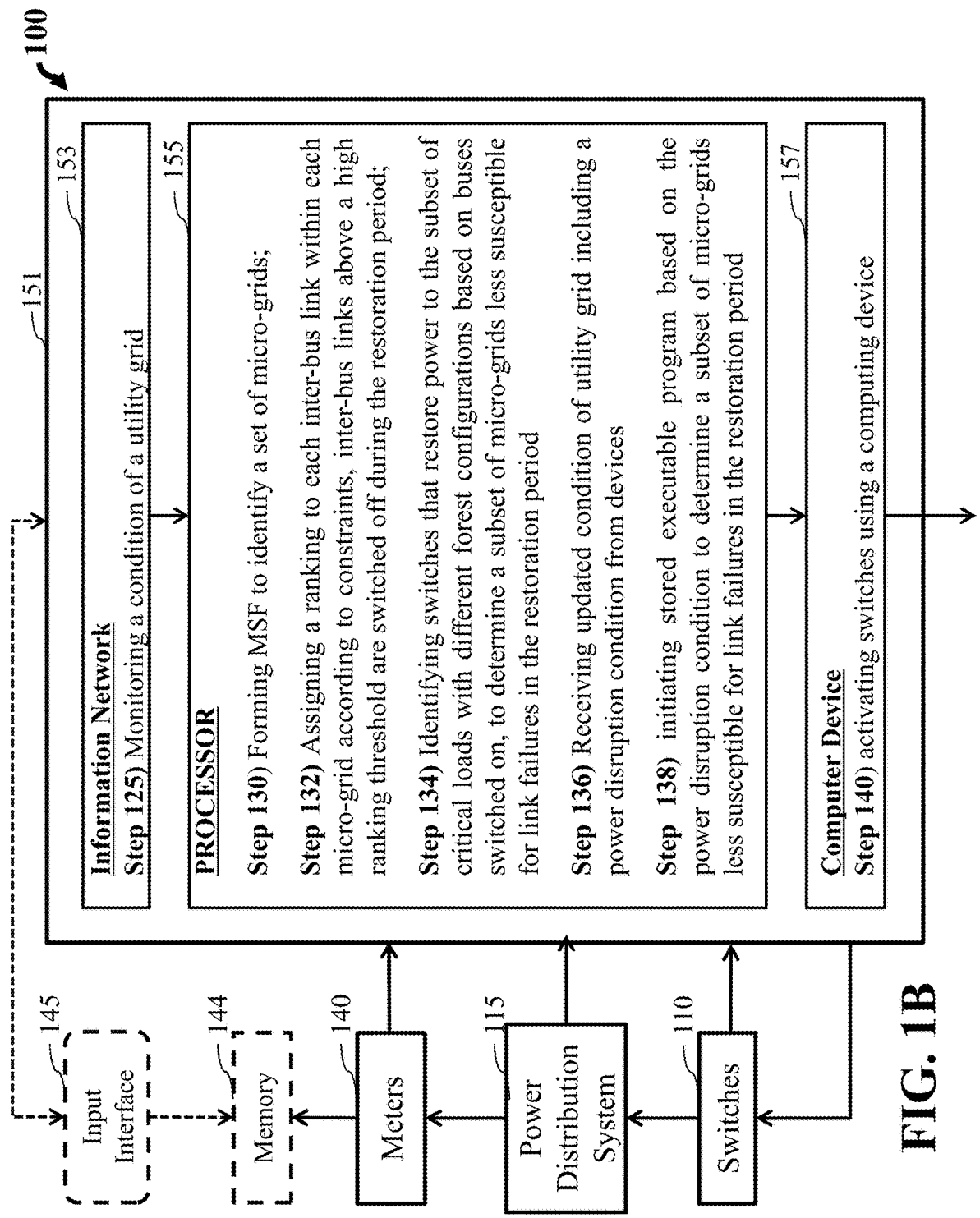
FIG. 1B is a block diagram illustrating the system of FIG. 1A, implemented using some components of the system, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates to providing systems and methods for resilient restoration of power distribution systems after a natural disaster.

Embodiments of the present disclosure provide an approach for restoring services for loads according to corresponding priority levels based on a concept of minimum spanning forest (MSF). Each edge in the power distribution system is assigned a weight to represent its vulnerability/resilience based on several factors such as their exposure to vegetation, span length, location and structures supporting them. The concept of MSF is realized by switching off the edges with higher weighted edges during a restoration process such that the probability of link failure is reduced. The determination of the restoration procedure is formulated as a mixed-integer linear program problem to be solved with consideration of three-phase unbalance of the power distribution system, and the uncertainty caused by load consumptions and intermittent renewable. Through optimally placing/controlling tie switches and locally available distributed generators (DGs) with energy storage system(s) (ESS), the performance of power distribution system can be significantly enhanced in the post-disaster period.

FIG. 1A is a block diagram illustrating a method for restoring power in a power distribution network, according to embodiments of the present disclosure. Step 125 includes method 100 using monitoring/measuring devices in the power distribution grid to monitor a condition of a utility grid via an information network 153. The utility grid may include a main grid, and the distribution grid.

Step 130 includes method 100 using a hardware processor 155 of a computer 151 to form a minimum spanning forest (MSF) to identify a set of micro-grids, wherein each spanning tree in a forest is configured to be a micro-grid that is a self-sustained islanded micro-grid network, when a power disruption condition is detected.

Still referring to step 132 of FIG. 1A, the hardware processor 155 to assign a ranking to each inter-bus link within each micro-grid according to one or more constraints, such that a ranked sum of the inter-bus links is minimized in each micro-grid in the set of micro-grids, and wherein inter-bus links above a high-ranking threshold are switched off during the restoration period.

Step 134 using the hardware processor 155 to identify switches that restore power to the subset of critical loads with different forest configurations based on buses that are switched on, to determine a subset of micro-grids from the set of micro-grids that are less susceptible for link failures in the restoration period.

Step 136 using the hardware processor 155 to receive updated condition of utility grid including a power disruption condition from devices.

Step 138 using the hardware processor 155 to initiate the stored executable program based on the updated condition of the utility grid to determine a subset of micro-grids from the set of micro-grids that are less susceptible for link failures in the restoration period.

Still referring to step 140 of FIG. 1A, using a computer device 157 to activating switches using a computing device of computing devices of a computing hardware system communicatively linked to utility grid via information network 153.

Some embodiments of the present disclosure provide unique aspects, by non-limiting example, using locally available distributed generators (DGs) to provide critical loads when the main power grid is not available to reduce the impact in the community due to a prolonged outage. This approach restores the critical loads, in part, by utilizing the concept of minimum spanning forest (MSF) to formulate the power restoration problem, where each spanning tree in a forest is a self-sustained islanded grid (SSIG). Specifically, a vulnerability based weight is assigned to each edge in a distribution system based on several factors such as their exposure to vegetation, span length, location and structures supporting them. Then, an MSF is obtained for the given network by switching off the edges with higher weights to form several SSIGs, each is energized by a micro-turbine (MT) with black-start capability and other energy systems (DGs) (i.e. renewable & energy storage systems), while achieving resilience objectives. Primary objective function of resilient restoration is to restore maximum critical loads, and fewer non-critical loads, using DGs, until the main power grid is back. Secondary objective function is that different SSIGs are formed by switching off the edges with higher vulnerability weights to get minimum spanning forest (MSF), so as to achieve resilience objectives. Overall objective function is a combination of Primary/Secondary objectives with proper value of weight selected to ensure that the secondary objective is considered, only when the primary objective values are the same.

FIG. 1B is a block diagram illustrating the system of FIG. 1A, wherein the system is implemented using some components, according to embodiments of the present disclosure. FIG. 1B can include a hardware processor 155 in communication with an input interface 145, a memory 144, an information network 153, a computer device 157. The computer device 157 can be connected to the set of switches 110 that installed in the power distribution system 115. The power distribution system can have a set of meters 140 to monitor the condition information of the system 115. The computer 151 can control the set of switches 110 as well as can send and receive information. It is contemplated the hardware processor 155 can include two or more hardware processors depending upon the requires of the specific application. Certainly, other components may be incorporated with method 100 including input interfaces, output interfaces and transceivers.

Still referring to FIG. 1B, aspects of the system 100 include step 125 of monitoring a condition of a utility grid from devices in the power distribution grid via an information network 153. Step 130 includes forming a minimum spanning forest (MSF) to identify a set of micro-grids, wherein each spanning tree in a forest is configured to be a micro-grid that is a self-sustained islanded micro-grid network, when a power disruption condition is detected. Step 132 includes assigning a ranking to each inter-bus link within each micro-grid according to one or more constraints, such that a ranked sum of the inter-bus links is minimized in each micro-grid in the set of micro-grids, and wherein inter-bus links above a high-ranking threshold are switched off during the restoration period. Step 134 includes identifying switches that restore power to the subset of critical loads with different forest configurations based on buses that are switched on, to determine a subset of micro-grids from the set of micro-grids that are less susceptible for link failures in the restoration period. Step 136 includes receiving updated condition of utility grid including a power disruption condition from devices. Step 138 includes initiating the stored executable program based on the updated condition of the utility grid to determine a subset of micro-grids from the set of micro-grids that are less susceptible for link failures in the restoration period. Step 140 includes activating switches using a computing device of computing devices of a computing hardware system communicatively linked to utility grid via information network.

Figure 1C:
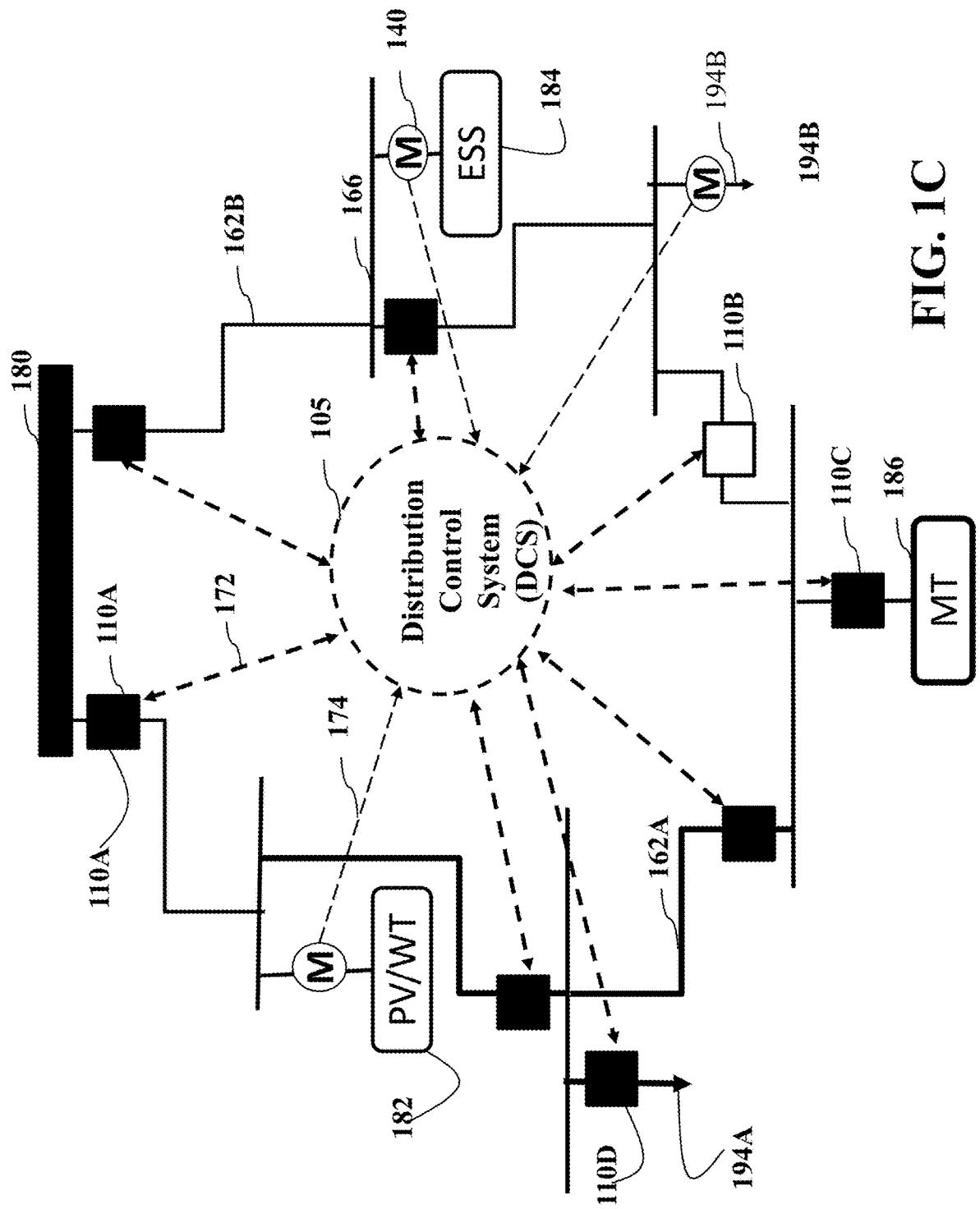
FIG. 1C is a schematic illustrating the components of power distribution system and the relationship between the components of the system, according to some embodiments of the present disclosure.

FIG. 1C is a schematic illustrating the components of power distribution system and the relationship between the components of the system, according to some embodiments of the present disclosure. The power distribution system 115 is operated by a distribution control system 105. It transfers the powers supplied by the generation sources, 180, 182, 184 and 186 to the customers, 194A and 194B through distributions lines, 162A and 162B. The generation resources can include the main grid 180, and various distribution generations sources, including micro-turbines 186, intermittent resources 182 (such as Photovoltaic or wind turbine), energy storage system 184 (such as battery). Each distribution line, 162A and 162B is connected with two buses, 166, and each bus can be connected with generation sources, customers and other lines. The distribution system is normally fed by a main grid through a substation bus, 180. Both the main grid and the distribution grid can be part of the utility grid. The distribution control system can also be included into the control system for the utility grid.

Still referring to FIG. 1C, some critical aspects for a successful service restoration can include choosing the right generation mix to ascertain reliable and durable power supply during the restoration process. The customers are divided into high priority customers 194A and low priority customers 194B, and the power supplies for customers with higher priority are restored first after a disaster if possible. The distribution lines are also classified into high resilient (or less vulnerable) distribution lines 162A, low resilient (or more vulnerable) distribution lines 162B. The restoring paths consisting of high resilient distribution lines are preferred to be used first when restoring the power services to ascertain higher resiliency for possible second or future disaster strikes.

There are many factors that can impact the resilience or vulnerability of a distribution line. For example, an overhead line within dense tree area is more vulnerable to the disaster strikes. The connectivity of the power distribution system is determined and adjusted by the statues of remotely controlled breakers and switches, 110A, 110B, 110C and 110D installed in the system. The switch or breaker can be closed 110A, 110C, 110D or be opened 110B remotely by the distribution control system (DCS) 105 with bi-way communication links 172. Those switches or breakers are commonly equipped with additional measurement or metering units to send back switch statuses, switch terminal voltages, and power flows through the switches to the DCS 105. The breakers/switches can be further categorized into line switch or circuit breaker 110A and 110B, generator switch 110C and load switch 110 D. In addition, there are also meters 140 installed within the system for helping monitoring the conditions of the system. Those meters can be a phasor measurement unit (PMU), a remote terminal units (RTU), a fault indicators (FI), a fault disturbance recoders (FDR) and other devices that can communicate with the DCS 105 via one-way or two-way communication links 174. One embodiment of the present disclosure generates a set of self-sustained islanded grid through the operation of switches, 110A, 110B, 110C and 110D, and each self-sustained islanded grid has a suitable generation mix such as micro turbines and energy storage systems to withstand the uncertain load consumption and resultant generation variations from the intermittent resources for a certain period of upcoming times. The DCS 105 can communicate with the dispatchable generations 186 and the energy storage systems 186 to adjust their output levels for operational needs. Another embodiment of the present disclosure uses the minimum spanning forest (MSF) concept to form self-sustained islanded grids to the resilience or physical survivability criteria during disaster period, while maximally restoring customers' power supply according to priority and maintaining each islanded grid with adequate resilience for withstanding possible more upcoming strikes.

Figure 2:
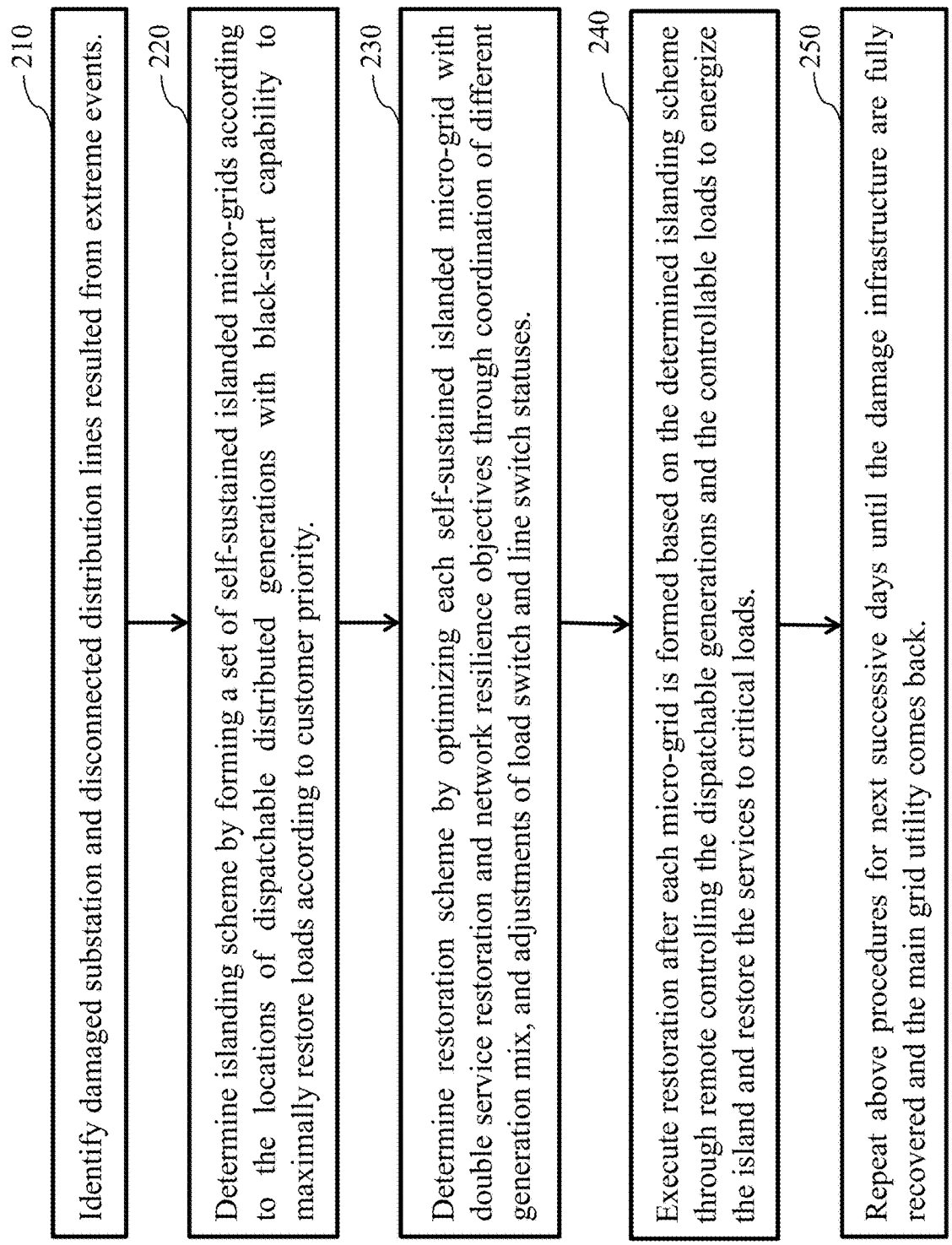
FIG. 2 is a block diagram illustrating some method steps for restoring power in a power distribution network, according to embodiments of the present disclosure.

FIG. 2 is a block diagram illustrating some method steps for restoring power in a power distribution network, according to embodiments of the present disclosure.

Referring to FIG. 2, step 210 includes the step to identify the disaster damage, including isolated faulted substation and isolated faulted distribution lines after the extreme events occur.

Step 220 determines islanding scheme by forming a set of self-sustained islands according to the locations of dispatchable distributed generations with black-start capability to maximally restore loads according to customer priority.

Step 230 determines restoration scheme by optimizing each self-sustained island with double service restoration and network resilience objectives through coordination of different generation mix, adjustments of load switch and line switch statuses.

Step 240 executes the restoration after each island is formed based on the determined islanding scheme through remote controlling the dispatchable generations and the controllable loads to energize the island and restore the services to critical loads.

Step 250 repeats the above procedures for the next successive days until the damage infrastructure is fully recovered and the main grid utility comes back.

Resilient Restoration Problem Description

Figure 3:
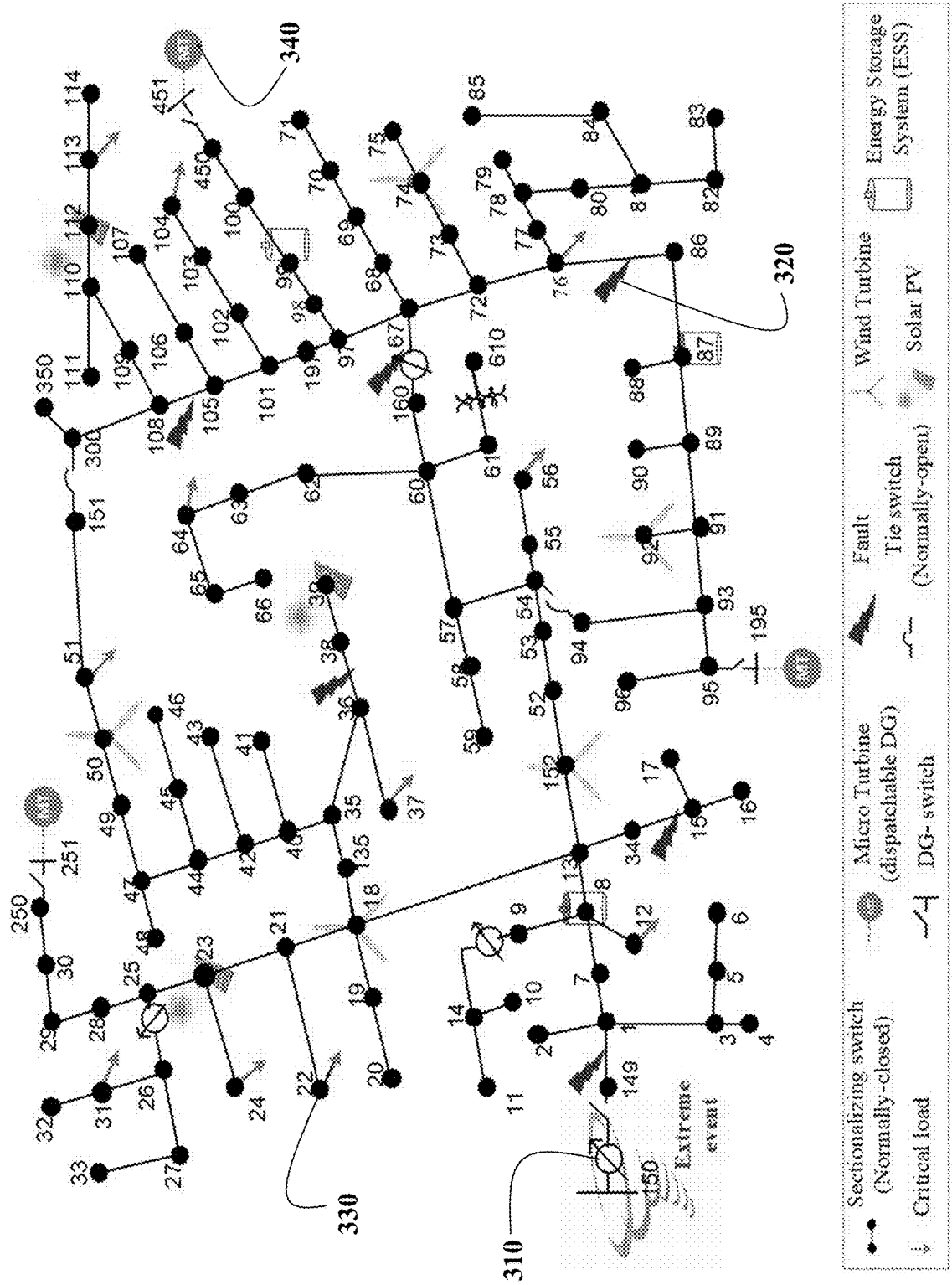
FIG. 3 is a schematic illustrating a 123-node distribution system under a natural disaster scenario, according to embodiments of the present disclosure.

FIG. 3 shows a exemplar 123-node distribution system under a natural disaster scenario. This system operates at the nominal voltage of 4.16 kV with the total active power and reactive power demands as 3490 kW and 1920 kVAr, respectively. There are two tie switches, 54-94 and 151-300 in the system.

A major disaster may cause multiple line outages simultaneously, and sometimes even the blackout of main substations. In FIG. 3, the substation is at fault 310, and customers, 330 fed by the feeder are deprived of normal supply. In addition, several distribution lines are at fault, 320.

Still referring to FIG. 3, the distribution system consists of few dispatchable DGs such as microturbines (MTs), 340 that can be scheduled to provide varying real and reactive power demand from critical resources while maintaining the frequency and voltage of the restored network. It is assumed that distribution circuit is equipped with enough remote controlled sectionalizing and tie switches for enhancing the restorability. Despite open-loop configurations arising from tie-switches, radial topology is maintained in the restored circuits, implying each MT acts as a source to only one SSIG. Specifically, this means no SSIGs are networked in the restoration process.

Figure 4:
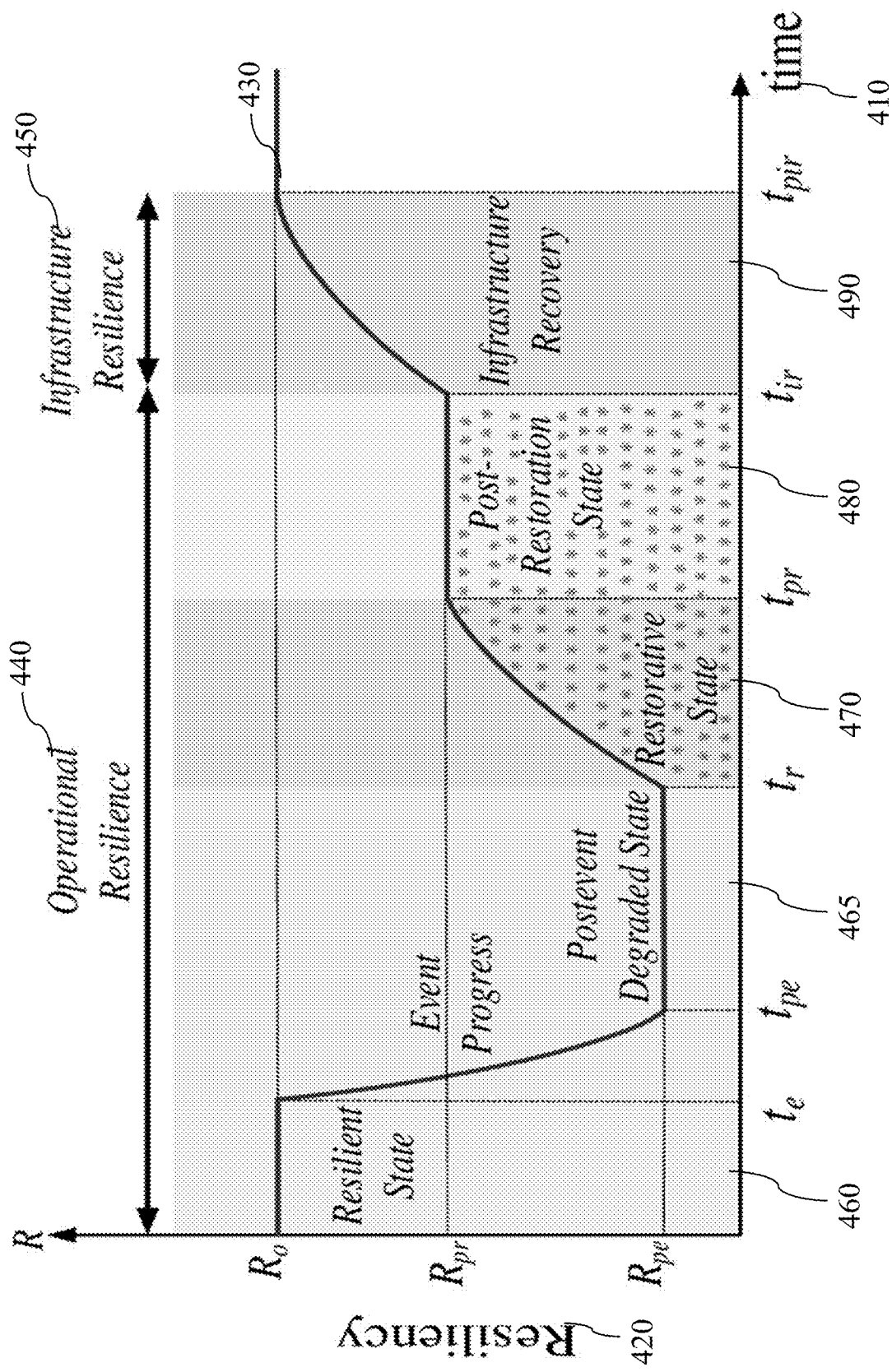
FIG. 4 is a schematic illustrating aspects of a conceptual resilience curve showing different states of a power distribution system, according to embodiments of the present disclosure.

FIG. 4 shows a conceptual resilience curve demonstrating different states of a power distribution system. The horizontal and vertical axes, 410 and 420 represent the different frames along with the disaster evolution, and corresponding network resiliency, respectively. The shaded region is the time frame we are interested in. As shown in FIG. 4, the response of the power grid in case of an extreme event is divided into different time frames, 460, 465, 470, 480 and 490. The system undergoes through the degraded and restorative state before the utility comes back and infrastructure recovery has been completed by time ($t_{pir}$). We specifically focus on time frame from $t_r$ to $t_{tr}$, 470 and 480 where some restorative actions are implemented by utility and crew members such that system gradually moves from degraded to restorative state.

Still referring to FIG. 4, the restorative actions are completed at $t_{pr}$, the system reaches a higher level of performance called as post-restoration state 480 with resiliency level $R_{pr}$. It is important to note that, based on the severity of the event, infrastructure may take a longer time to fully recover and hence achieving the original resiliency may not be possible at the end of post-restoration state, i.e., $R_{pr} \leq R_o$. Thus, the system remains on the post-restoration state where several islands or isolated system are formed as per the restoration algorithm until the normal power from the utility comes back. Usually, during an outage caused by extreme events, it takes several days and sometimes even weeks and months to access normal power from the utility. A recent example is an outage in Puerto Rico where strong winds and tree branches damaged power lines, transmission towers and substations that were already weakened by hurricane Irma less than two weeks before the strike of hurricane Maria and the result was complete blackout. Thus, it is very important to ensure that the restoration solutions do not fail in the aftermath of the disaster before the main grid comes back. One key approach to restoring the loads after a natural disaster is to use the local DGs by suitable islanding scheme. With this in mind, we disclose a resilient restoration strategy to restore the maximum possible critical loads by forming a MSF from the available DGs in the network.

Still referring to FIG. 4, the distribution network can be modeled as a graph G=(V,E) with set of buses or nodes V and set of edges E. The restoration of distribution system can be viewed as splitting the graph into self-adequate sub-areas which are referred as 'Self-Sustained Islanded Grid'. Each SSIG is energized by a single MT and other non-dispatchable DGs and no MTs are networked in the restoration process. The statues or states of nodes and edges are represented by corresponding binary variables accordingly.

For each node, we have a binary variable to represent its energizing state. Since MTs are not networked during the restoration process, each node can belong to only one SSIG. A binary variable $v_i = \{0,1\}$ is assigned to node i, and $v_i = 1$ implies that node i belongs to one of the SSIGs while $v_i = 0$ implies node i is not energized during the restoration process.

Still referring to FIG. 4, for each node, we also have a binary variable to represent the pick-up state for its load. In a disaster condition, it is not possible to pick up all the loads in the outage area. Thus, a load with lower priority needs to be switched off while supplying a higher priority load. A binary variable $s_i = \{0,1\}$ is assigned to each of node, where $s_i = 1$ implies that load connected to node i is picked up and vice-versa. Note that for a load to be picked up both $v_i$ and $s_i$ should pick a value of 1.

For each line and MT switch, we have a binary variable to represent its status. Although loop configuration resulting from the combination of tie switches and sectionalizing switches leads to several possible paths to supply the loads, it is required that the restored network will always operate in radial topology thus requiring a decision upon which switches to open or close for executing the restoration process. A binary variable $\delta_{ij} = \{0, 1\}$ is assigned to each of the sectionalizing and tie switches, where $\delta_{ij} = 1$ implies that switch joining nodes i and j is closed and vice-versa. Similarly, a dispatchable DG i.e., a MT is modeled as a virtual switch in the disclosed framework and a binary variable $\delta_{ij} = \{0, 1\}$ is assigned to each MT switch where $\delta_{ij} = 1$ implies that MT is connected to node i and virtual switch between substation node i and MT-node j is closed. The MT is ready to inject power $P_{MT}$ and $Q_{MT}$ to node j, when its status is set to be 1.

Figure 5A:
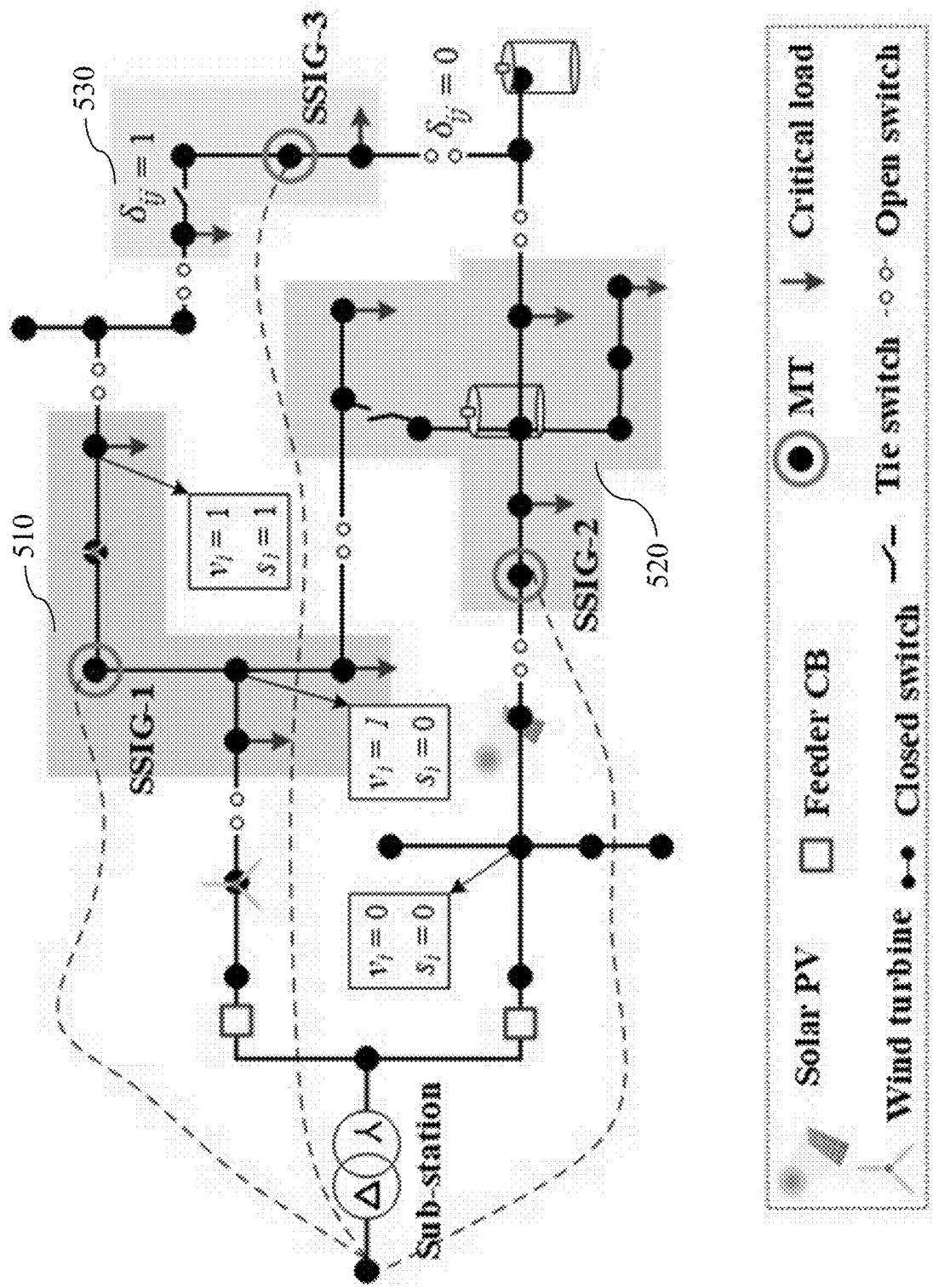
FIG. 5A is a schematic illustrating a feeder and graphical representation of self-sustained islanded grids, according to embodiments of the present disclosure.

FIG. 5A shows the graphical representation of the distribution system restoration problem and illustrates the operation of several switches to restore the loads. Each of the colored/shadowed patch represent an isolated area energized by a MT, DGs and ESS. It includes three SSIGs, including SSIG-1, SSIG-2, and SSIG-3, 510, 520 and 530.

Resilient Restoration Problem Formulation

In this disclosure, the resilient restoration of distribution system with DGs is formulated as a constrained multi-objective problem, i.e. a mixed integer linear programming problem.

Distribution system upgrades need to be well planned to meet the resilience performance targets during extreme events. The optimal upgrade profile can ensure resilient operation for typical disaster scenarios. Suppose, the predetermined load satisfaction level for which the resilient planning is done be $\lambda=\lambda_{min}$ and $\beta=\beta_{min}$. Note that $\lambda$ and $\beta$ are the resilience criteria in the percentage of critical and non-critical loads. For example, $\lambda_{min}=0.8$ and $\beta_{min}=0.1$. With this consideration, the primary objective function of resilient restoration is to restore maximum possible critical and few non-critical loads using distributed generators (DGs):

$$\text{Maximize } \Sigma_t^{t+T^H}(\lambda_t+\beta_t) \quad (1)$$

where, t is the time interval, $T^H$ is the optimization horizon, $\lambda_t$ and $\beta_t$ are the fractions of critical and non-critical loads picked up for time interval t during the restoration, and defined and constrained as:

$$\lambda_t = \frac{\sum_{i \in v_c} \sum_{\phi \in \{a,b,c\}} s_{i,t} P_{Li,t}^\phi}{\sum_{i \in v_c} \sum_{\phi \in \{a,b,c\}} P_{Li,t}^\phi}, \quad (2a)$$

$$\beta_t = \frac{\sum_{i \in (v-v_c)} \sum_{\phi \in \{a,b,c\}} s_{i,t} P_{Li,t}^\phi}{\sum_{i \in (v-)} \sum_{\phi \in \{a,b,c\}} P_{Li,t}^\phi} \quad (2b)$$

$$\lambda_t \geq \lambda_{min} \text{ and } \beta_t \geq \beta_{min}, \quad (2c)$$

where i is the index for a general node, V is the set of nodes in the graph G representing the distribution system, $V_c$ is the set of nodes where critical loads are connected, $(V-V_c)$ is the set of nodes where non-critical loads are connected, $\phi \in \{a, b, c\}$ represents the set of phases of a bus, $s_{i,t}$ is the load pick-up variable of node i at time t, $P_{Li,t}^\phi$ is the real power demand at node i for phase $\phi$ at time t.

Different isolated areas (SSIGs) are formed using DGs to restore the loads after an extreme event where each area is energized by a single MT in coordination with several intermittent DGs. Specifically, several sub-trees are formed and each sub-tree is operating in a radial topology. In graph theory, such a process is referred to as forming a spanning forest where each spanning tree is a connected network. It is also well understood that the restoration scheme should be able to withstand any further shock or second strike of a disaster. In addition, the distribution network is stressed after experiencing an extreme event. Thus, it is desired that the restoration solution obtained from the proposed approach doesn't fail physically before the utility power comes back. The main reason of fault in the distribution system is because of trees falling on lines, wind loading or snow storm causing lines to be tripped. Thus, a new metric is defined such that distribution lines with longer spans, having right-of-way across a dense vegetation (trees) or those which are prone to failures are avoided. Specifically, a weight is assigned to each edge based on above-mentioned factors and we try to minimize the weighted sum of edges in a restored network. This is in accordance with the formation of MSF in a distribution network.

Figure 5B:
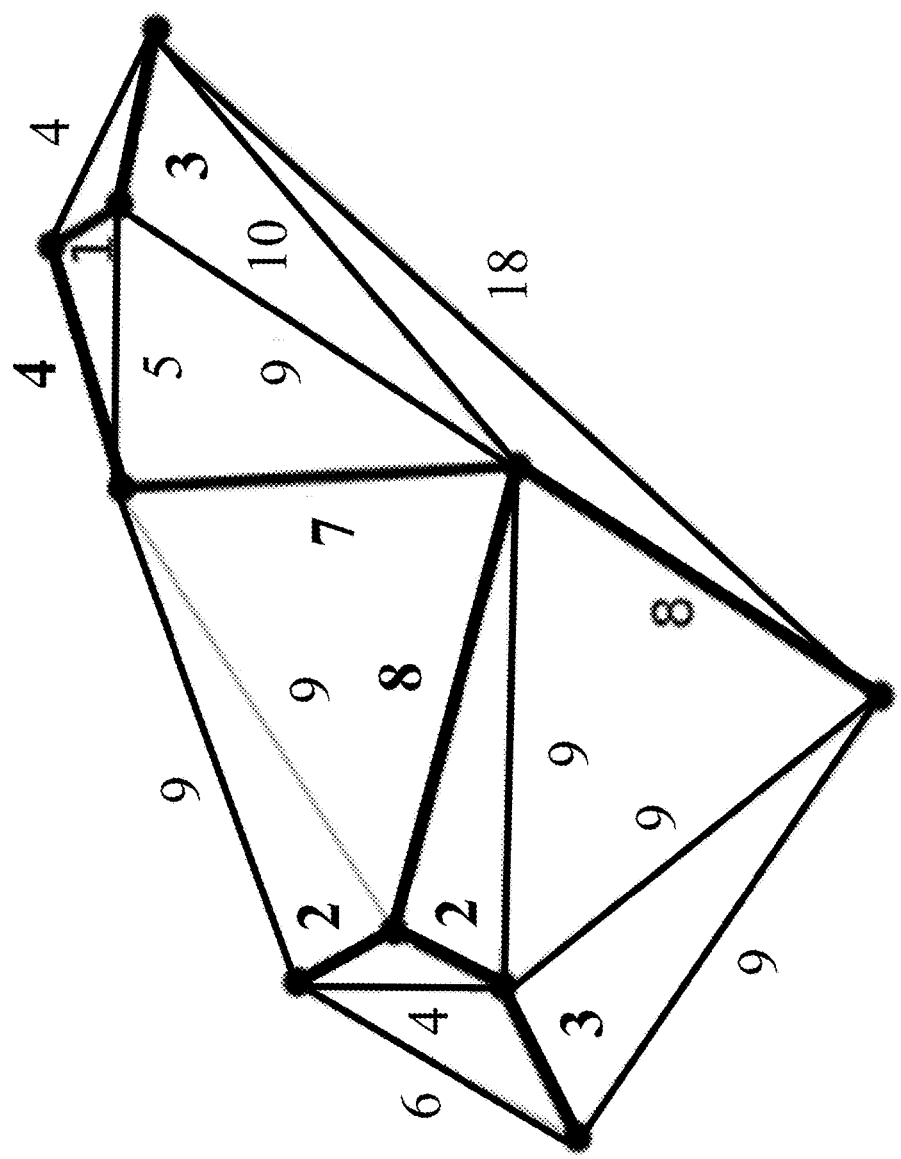
FIG. 5B is a schematic illustrating that the MSF can be considered as a set of independent minimum spanning trees, or minimum weight spanning trees, according to aspects of the present disclosure.

FIG. 5B is a schematic illustrating that the MSF can be considered as a set of independent minimum spanning trees, or minimum weight spanning trees, according to aspects of the present disclosure. For example, each tree is a subset of the edges of a connected, edge-weighted (un)directed graph for a independent sub-area that connects all the vertices of the sub-area together, without any cycles and with the minimum possible total edge weight. That is, it is a spanning tree whose sum of edge weights is as small as possible. More generally, any edge-weighted undirected graph (not necessarily connected) has a MSF, which is a union of the minimum spanning trees for its connected components. In regard to the graph below, a planar graph and its minimum spanning tree. Each edge is labeled with its weight, which here is roughly proportional to its length.

An example of a use case for minimum spanning trees. One example would be a telecommunications company trying to lay cable in a new neighborhood. If it is constrained to bury the cable only along certain paths (e.g. roads), then there would be a graph containing the points (e.g. houses) connected by those paths. Some of the paths might be more expensive, because they are longer, or require the cable to be buried deeper; these paths would be represented by edges with larger weights. Currency is an acceptable unit for edge weight, however, there is no requirement for edge lengths to obey normal rules of geometry such as the triangle inequality. A spanning tree for that graph would be a subset of those paths that has no cycles but still connects every house; there might be several spanning trees possible. A minimum spanning tree would be, for example, one with the lowest total cost, representing the least expensive path for laying the cable.

Different forest configurations represent a set of forests with same tree roots but different configurations of tree branches. The trees may have different set of nodes, and different set of edges. In present disclosure, it represents different set of loads to be picked up, and through different paths along distribution lines with different resilient weights. Due to resource limitation, some nodes might be excluded from the node sets.

Different SSIGs are formed by switching the edges with higher weights to get MSF which is our secondary objective function, and defined as:

$$\text{Minimize } \Sigma_{(i \rightarrow j) \in E} \delta_{ij} w_{ij}^{all} \quad (3)$$

where, $\delta_{ij}$ is the status variable for the line between node i and node j, E is the set of lines in G. $w_{ij}^{all}$ is the weight for the line between nodes i and j, and defined according to:

$$w_{ij}^{all} = \mu L_{ij} w_{ij}^{veg} + (1-\mu)(w_i^{sub} + w_j^{sub})$$

Where $w_{ij}^{veg}$ and $L_{ij}$ are the vulnerability weight and length for the line between nodes i and j, $w_i^{sub}$ and $w_j^{sub}$ are the vulnerability weights for nodes i and j, it is allocation factor for vulnerability contribution of power wires to total line vulnerability. $w_{ij}^{veg}$ is defined according to power wire vulnerability, supporting tower/pole vulnerability, and surrounding impacts such as exposes to vegetation. $w_i^{sub}$ is defined according to the structure and location of the substation corresponding to node i, such as substation foundation level, and location disaster vulnerability.

The overall objective function for resilient restoration (4a) is a combination of the primary and secondary objectives provided in (1) and (3):

$$\text{Minimize } \Sigma_t^{t+T^H}(-\lambda_t-\beta_t)+w_s\Sigma_{(i\to j)\in E}\delta_{ij}(w_{ij}^v\times L_{ij}), \quad (4a)$$

where $w_s$ is the weight for the secondary objective. A proper value of weight, $w_s$ should be selected to ensure that the secondary objective is considered only when the primary objective values are the same.

The two objective problem can also be solved through a two stage procedure. In the first stage, the restoration problem is solved by only considering the first objective. When the solution is obtained, the restoration problem is resolved in the second stage by considering only the second objective, but with a additional constraint on the minimum restored load requirement defined based on the first stage solution. This relaxed restored load constraint is descried as:

$$\Sigma_t^{t+T^H}(\lambda_t+\beta_t)\geq \underline{L}^{Res}, \quad (4b)$$

Where, $\underline{L}^{Res}$ is the minimum restored load that is defined as fraction of the optimal objective value for the first stage solution. The goal of first stage is to build a MSF to restore critical loads. In comparison, the second stage is to adjust the forest configuration to improve the resilience for the restored network.

Several constraints associated with the disclosed restoration problem need to be considered. The first set of constraints is related to connectivity constraints for nodes and lines:

$$v_i \leq 1, \forall i \in V \quad (5a)$$

$$s_{i,t} \leq v_i, \forall i \in V^R \quad (5b)$$

$$s_{i,t} = v_i, \forall i \in (V-V^R) \quad (5c)$$

$$\delta_{ij} \leq v_i v_j, \forall (i\to j) \in (E-E^F) \quad (6a)$$

$$\delta_{ij} = 0, \forall (i\to j) \in E^F \quad (6b)$$

$$\Sigma_{(i\to 1)\in E^C}\delta_{ij} \leq |E^C|-1, \forall (i\to j) \in V \quad (7)$$

where, $v_i$ is the node assignment variable, $V^R$ is the set of nodes in G with remotely switchable load, $E^F$ is the set of damaged or disconnected lines, $E^C$ is the set of switches in a cycle C, $|E^C|$ is the number of switches in a cycle C.

Constraint (5a) implies that a node can be picked up by one of the SSIGs in a restoration process and at max, it can take a value of 1. Equation (5b) and (5c) requires that a load with the switch can only be energized if it is connected to an energized node and a non-switchable load will be energized based on node variable.

Decision variables for line ($\delta_{ij}$) is obtained from (6). This implies that during normal operating conditions, the decision variables for a line to be used in the restoration depends upon the nodes that are energized. Equation (6a) ensures that if a line with remotely controlled switch is energized, nodes connecting that line must be energized. The fault or open switches in a distribution network is modeled using constraint (6b).

A new radial configuration of the faulted power distribution system is achieved by closing and opening appropriate tie switches, sectionalizing switches and MT virtual switches. This radiality is ensured by constraint (7) which enforces at least one of the switches in a cycle to be open. The number of cycles and the edges within a cycle are enumerated using iterative loop counting algorithm which is a "brute force" technique.

The second set of constraints is related to power balance and voltage constraints. A three-phase AC linearized power flow model is used to express the power balance and voltage constraints. A π-model is used to represent a distribution line. For each line (i→j), the basic circuit law gives:

$$V_i - V_j = z_{ij}^{se} I_{ij} \quad (8)$$

where, $V_i = [V_i^a V_i^b V_i^c]^T$ is the vector of complex numbers representing three-phase voltage at node i, $z_{ij}^{se}$ is a matrix of complex numbers representing the series impedances between phases for line between node i and node j, including a resistance part $r_{ij}^{se}$, and a reactance part, $x_{ij}^{se}$. $I_{ij}$ is the vector of complex numbers representing currents flowing through the line between node i and node j.

The line current is related to complex power flow, $P_{ij}+jQ_{ij}$ and complex value of node voltages, $V_i$ is given by equation (9a):

$$P_{ij}+jQ_{ij} = V_i \otimes I_{ij}^* \quad (9a)$$

Replacing (9a) in (8) yields (9b):

$$V_i - V_j = Z_{ij}^{se}(P_{ij}-jQ_{ij}) \oslash V_i^* \quad (9b)$$

where, $\otimes$ and $\oslash$ denotes the element-wise multiplication and division respectively.

It is observed that the voltage magnitudes between the phases are similar and that the phase unbalances on each bus are not very severe. Therefore, it can be assumed that line losses are small compared to power flows, thus the quadratic terms can be neglected, and voltages are nearly balanced. i.e., $$V_i^a/V_i^b \approx V_i^b/V_i^c \approx V_i^c/V_i^a \approx e^{\frac{j2\pi}{3}}.$$

With these assumptions, using equation (9b), voltage magnitudes can be updated according to:

$$|V_i|^2 - |V_j|^2 = 2(\tilde{r}_{ij}^{se}P_{ij}+\tilde{x}_{ij}^{se}Q_{ij})+c_{ij}(P_{ij},Q_{ij}) \quad (10)$$

where $\tilde{r}_{ij}^{se} = \text{Real}\{\alpha\alpha^H\}\otimes r_{ij}^{se}+\text{Im}\{\alpha\alpha^H\}x_{ij}^{se}$, $\tilde{x}_{ij}^{se} = \text{Real}\{\alpha\alpha^H\}\otimes x_{ij}^{se}-\text{Im}\{\alpha\alpha^H\}\otimes r_{ij}^{se}$, $$\alpha = \begin{bmatrix} 1 & e^{\frac{-j2\pi}{3}} & e^{\frac{j2\pi}{3}} \end{bmatrix}^T,$$

$\alpha^H$ is the conjugate transpose of α. $c_{ij}(P_{ij}, Q_{ij})$ is the higher order term and can be neglected based on loss ignorable assumption. Thus, neglecting higher order term and denoting $U_i = [|V_i^a|^2 \ |V_i^b|^2 \ |V_i^c|^2]^T$, we have:

$$U_i - U_j = 2(\tilde{r}_{ij}^{se}P_{ij}+\tilde{x}_{ij}^{se}Q_{ij}) \quad (11a)$$

Similarly, for the shunt branches of line (i→j) at terminal buses i and j, the power flows through those shunt branches are approximately related to terminal voltages according to:

$$U_i = 2(\tilde{r}_{ij}^{sh}P_{ic}^{sh}+\tilde{x}_{ij}^{sh}Q_{ic}^{sh}) \quad (11b)$$

$$U_j = 2(\tilde{r}_{ij}^{sh}P_{jc}^{sh}+\tilde{x}_{ij}^{sh}Q_{jc}^{sh}) \quad (11c)$$

where $\tilde{r}_{ij}^{sh} = \text{Real}\{\alpha\alpha^H\}\otimes r_{ij}^{sh}+\text{Im}\{\alpha\alpha^H\}\otimes x_{ij}^{sh}$, $\tilde{x}_{ij}^{sh} = \text{Real}\{\alpha\alpha^H\}\otimes x_{ij}^{sh}-\text{Im}\{\alpha\alpha^H\}\otimes r_{ij}^{sh}$, $r_{ij}^{sh}+jx_{ij}^{sh}$ is the inverse of half of shunt admittance matrix of line (i→j), i.e. $r_{ij}^{sh}+jx_{ij}^{sh} = 2(Y_{ij}^{sh})^{-1}$, $Y_{ij}^{sh}$ is the whole shunt admittance matrix of line (i→j). $P_{ic}^{sh}+jQ_{ic}^{sh}$, and $P_{jc}^{sh}+jQ_{jc}^{sh}$ are the vectors of power flows injected into a common ground bus, c through buses i and j.

These voltage constraints are then coupled with line variables to write the voltage constraints for each time interval as follow:

$$U_{i,t} - U_{j,t} \leq 2(\tilde{r}_{ij} P_{ij,t} + \tilde{x}_{ij} Q_{ij,t}) + M(1-\delta_{ij}),$$

$$U_{i,t} - U_{j,t} \geq 2(\tilde{r}_{ij} P_{ij,t} + \tilde{x}_{ij} Q_{ij,t}) - M(1-\delta_{ij}),$$

$$\forall (i,j) \in V, \forall (i \rightarrow j) \in E \quad (12a)$$

$$U_i \leq 2(\tilde{r}_{ij}^{sh} P_{ic}^{sh} + \tilde{x}_{ij}^{sh} Q_{ic}^{sh}) + M(1-\delta_{ij}),$$

$$U_i \geq 2(\tilde{r}_{ij}^{sh} P_{ic}^{sh} + \tilde{x}_{ij}^{sh} Q_{ic}^{sh}) - M(1-\delta_{ij}),$$

$$\forall i \in V, \forall (i \rightarrow j) \in E \quad (12b)$$

$$U_j \leq 2(\tilde{r}_{ij}^{sh} P_{jc}^{sh} + \tilde{x}_{ij}^{sh} Q_{jc}^{sh}) + M(1-\delta_{ij}),$$

$$U_j \geq 2(\tilde{r}_{ij}^{sh} P_{jc}^{sh} + \tilde{x}_{ij}^{sh} Q_{jc}^{sh}) - M(1-\delta_{ij}),$$

$$\forall j \in V, \forall (i \rightarrow j) \in E \quad (12c)$$

$$v_i U^{min} \leq U_{i,t} \leq v_i U^{max}, \forall i \in V \quad (13)$$

Where $V_{i,t}$ and $U_{i,t}$ are the vector of complex numbers representing three phase voltage at node i and its square value of nodal voltage magnitude at time t. $P_{ij,t}/Q_{ij,t}$ are the three-phase active/reactive power flowing from node i to node j at time t, i.e. $P_{ij,t} = [P_{ij,t}^a \ P_{ij,t}^b \ P_{ij,t}^c]^T$, $Q_{ij,t} = [Q_{ij,t}^a \ Q_{ij,t}^b \ Q_{ij,t}^c]^T$, and $P_{ij,t}^\phi/Q_{ij,t}^\phi$ is corresponding active/reactive power flows in phase $\phi$. $P_{ic}^{sh}/Q_{ic}^{sh}$ are the three-phase active/reactive power flowing from node i into ground c at time t, i.e. $P_{ic,t}^{sh} = [P_{ic,t}^{sh-a} \ P_{ic,t}^{sh-b} \ P_{ic,t}^{sh-c}]^T$, $Q_{ic,t}^{sh} = [Q_{ic,t}^{sh-a} \ Q_{ic,t}^{sh-b} \ Q_{ic,t}^{sh-c}]^T$, and $P_{ic,t}^{sh-\phi}/Q_{ic,t}^{sh-\phi}$ is corresponding active/reactive power flows on shunt branches in phase $\phi$.

Constraints (12) is written for the voltage constraints by coupling with a line or switch variable $\delta_{ij}$.

$$\delta_{ij} = \begin{cases} \delta_{ij} & \text{if } (i \rightarrow j) \in (E - E^F) \\ 0 & \text{if } (i \rightarrow j) \in E^F \end{cases}, \forall (i \rightarrow j) \in E.$$

If two nodes i and j are connected without a remotely switchable line or if the line is energized, the voltage difference of the branch is then constrained by power flow; otherwise, the voltage difference is arbitrary. This is represented by equation (12) which ensures the equality constraints are applied for energized lines only. The voltage of each node should be within the limit and is ensured by equation (13). $U^{min}$ and $U^{max}$ are set to $0.95^2$ p.u. and $1.05^2$ p.u. respectively for each phase present in the line.

Nodal power balance, and associated branch power flow constraints are represented according to:

$$\Sigma_{(i \rightarrow j) \in E} \delta_{ij} P_{ij,t} + P_{j,t}^R + P_{j,t}^E = s_{j,t} P_{Lj,t} + \Sigma_{(i \rightarrow j) \in E} \delta_{ij} P_{jc,t}^{sh},$$

$$\Sigma_{(i \rightarrow j) \in E} \delta_{ij} Q_{ij,t} + Q_{j,t}^R + \delta_j Q_{j,t}^{cap} = s_{j,t} Q_{Lj,t} + \Sigma_{(i \rightarrow j) \in E} \delta_{ij} Q_{jc,t}^{sh}, \forall j \in V \quad (14)$$

$$-\delta_{ij}^- P_{ij}^{max} \leq P_{ij,t} \leq \delta_{ij}^+ P_{ij}^{max}, \forall (i \rightarrow j) \in E \quad (15a)$$

$$-\delta_{ij}^- Q_{ij}^{max} \leq Q_{ij,t} \leq \delta_{ij}^+ Q_{ij}^{max}, \forall (i \rightarrow j) \in E \quad (15b)$$

$$\delta_{ij}^+ + \delta_{ij}^- \leq \delta_{ij}, \forall (i \rightarrow j) \in E \quad (16)$$

where, $P_{j,t}^R/Q_{j,t}^R$ are the active/reactive powers from distributed generations other than MTs injected at node j at time t. $Q_{j,t}^{cap}$ are the reactive powers from the capacitors at node j at time t, and related to the bus voltage using equation similar to (12c). The active/reactive powers from MTs at node j at time t are treated as the power flows from virtual node i to node j, i.e., $P_{MT,t} = P_{ij,t}$ and $Q_{MT,t} = Q_{ij,t}$, $\forall (i \rightarrow j) \in E_v$, $E_v$ is the set of virtual edges for MTs connection. $P_{Li,t}/Q_{Li,t}$ are the three-phase active/reactive load demand at node i at time t, and $P_{Li,t}^\phi/Q_{Li,t}^\phi$ are the corresponding active/reactive load demand in phase $\phi$. $P_{i,t}^E$ is the active power output of the energy storage at node i at time t. $\delta_{ij}^+/\delta_{ij}^-$ represents the positive/negative directional flow status for line between node i and node j.

Power flow equations, ignoring the losses, are represented using (14). Three-phase linear power flow model is used in this formulation where power flow equations are written along each line. Equation (15) ensures that the line power on each phase of the energized line is maintained within the permissive range and is zero for an unenergized line. This is in accordance with the fact that only the energized lines can carry power. The negative inequality is needed because the power flow direction is unknown as tie switches reconfigures the network giving reverse power flow scenario. In some disaster scenarios, when several lines are at fault, power flows in different phases on the same line may have opposite directions, which is a very undesirable situation. Constraint (16) forces power in all phases to flow in the same direction as an engineering constraint.

Energy storage constraints are given in (17):

$$-\lambda_{i,t}^c P_{i,t}^{ch,max} \leq P_{i,t}^E \leq \lambda_{i,t}^d P_{i,t}^{dch,max} \quad (17a)$$

$$\lambda_{i,t}^c + \lambda_{i,t}^d \leq v_i \quad (17b)$$

$$SOC_{i,t} = SOC_{i,t-1} - \frac{T}{EC_i}(\lambda_{i,t}^d P_{i,t}^E \eta_d^{-1} + \lambda_{i,t}^c P_{i,t}^E \eta_c) \quad (17c)$$

$$SOC_i^{min} \leq SOC_{i,t} \leq SOC_i^{max} \quad (17d)$$

where $EC_i$ is the energy capacity of the energy storage at node i in kWh. T is the length of each time interval. $\eta_c/\eta_d$ is the charging/discharging efficiency of a battery. $p_{i,t}^{ch,max}/P_{i,t}^{ch,max}$ are the maximum charging and discharging power outputs. $SOC_{i,t}$ is the state of charge of a battery at node i at time t, $SOC_i^{max}$ and $SOC_i^{min}$ are the maximum and minimum SOC of battery at node i, $\lambda_{i,t}^c$ and $\lambda_{i,t}^d$ are the charging/discharging state of battery at node i at time t.

Constraint (17a) represents the charging and discharging limits of an energy storage system (ESS) depending on its operating mode. Charging action and discharging action are mutually exclusive; that is, an ESS works in only one mode at a certain time. This is ensured by (17b) which requires that an ESS can only start to charge or discharge when the connected node is energized. Constraint (17c) evaluates the state of charge (residual energy) of an ESS. Similarly, Constraint (17d) represents the limit of SOC.

The third set of constraints are related to MT capacity constraints:

$$\delta_{ij} P_{MT}^{min} \leq \Sigma_{\phi \in \{a,b,c\}} P_{ij,t}^\phi \leq \delta_{ij} P_{MT}^{max}, \forall (i \rightarrow j) \in E_v \quad (18a)$$

$$\delta_{ij} Q_{MT}^{min} \leq \Sigma_{\phi \in \{a,b,c\}} Q_{ij,t}^\phi \leq \delta_{ij} Q_{MT}^{max}, \forall (i \rightarrow j) \in E_v \quad (18b)$$

$P_{MT}^{max}/Q_{MT}^{max}$ and $P_{MT}^{min}/Q_{MT}^{min}$ are the maximum and minimum active/reactive power outputs of a MT.

Constraint (18) ensures that the in-flow power of each MT-node from virtual substation node should be less than or equal to the MT capacity. This is in accordance with the fact that all MTs are connected to a common substation node and are modeled using virtual edges.

The above-formulated multi-objective optimization problem is a mixed-integer linear program (MILP) problem which can be efficiently and quickly solved by off-the-shelf solvers. Compared with conventional path search based approaches, this approach can determine the restoration scheme for the distribution systems through one-time MILP solution, and then avoids the time-consuming iterations required by the path search approaches.

The results of the MILP solution provide optimal solutions for determining the switching schemes and operation control plans for restoring the power services of a distribution system after a disaster occurs. The results include energized status for each bus and line, open/close status for each line switch, load switch and generator switch, generation output levels for each dispatchable distributed generations at each time interval of a optimization horizon, charging and discharging status and residual energy levels for each energy storage system at each time interval of the optimization horizon.

The results provide the switching scheme to divide the distribution system into a set of self-sustained islanded grids, including a set of normally-opened tie switches to be opened, and a set of normally-closed sectionalizing switches to be closed. Each islanded grid has a right generation mix for maximally restoring the critical and noncritical loads within the islanded grid.

It also provides the switching scheme to switch off lines with higher vulnerability weights to enable the islanded grid less vulnerable to possible upcoming disaster conditions. The weight is based on multiple factors like their exposure to vegetation, span length, location and structure supporting them.

Moreover, it also provides the switching scheme to switch off loads that could not be restored under available generations. This scheme provides the information for which critical load or noncritical load will be picked up, and which load will be shed off.

In addition, it provides the operation control plans for all time intervals over the given optimization horizon to enable each islanded grid power balanced and voltages within allowed thresholds by adjusting output levels of dispatchable distributed generations, and energy storage systems accordingly against the load and intermittent generation timely variations.

Resilient Restoration Example

The exemplar distribution system shown in FIG. 3 is used to demonstrate how to use the disclosed method. The exemplar system includes 3 dispatchable resources (i.e. MT), 2 different types of non-dispatchable resources (5 WTs and 3 PVs), and 3 energy storage systems (i.e. ESS).

Components participating in the restoration of different categories have different operational attributes. For example, the output power of intermittent DGs (solar and wind) and load demand vary with the weather condition, human activities, and many other factors, causing uncertainties. However, a constant load profile can be assumed for the critical loads characterized using the expected value of the actual daily load profile. For non-critical loads, multipliers are used for a different period of time to model the uncertainties. Continuous operation of dispatchable DGs and ESS depends on the available generation resources (i.e., fuel reserve or state of charge).

Figure 6:
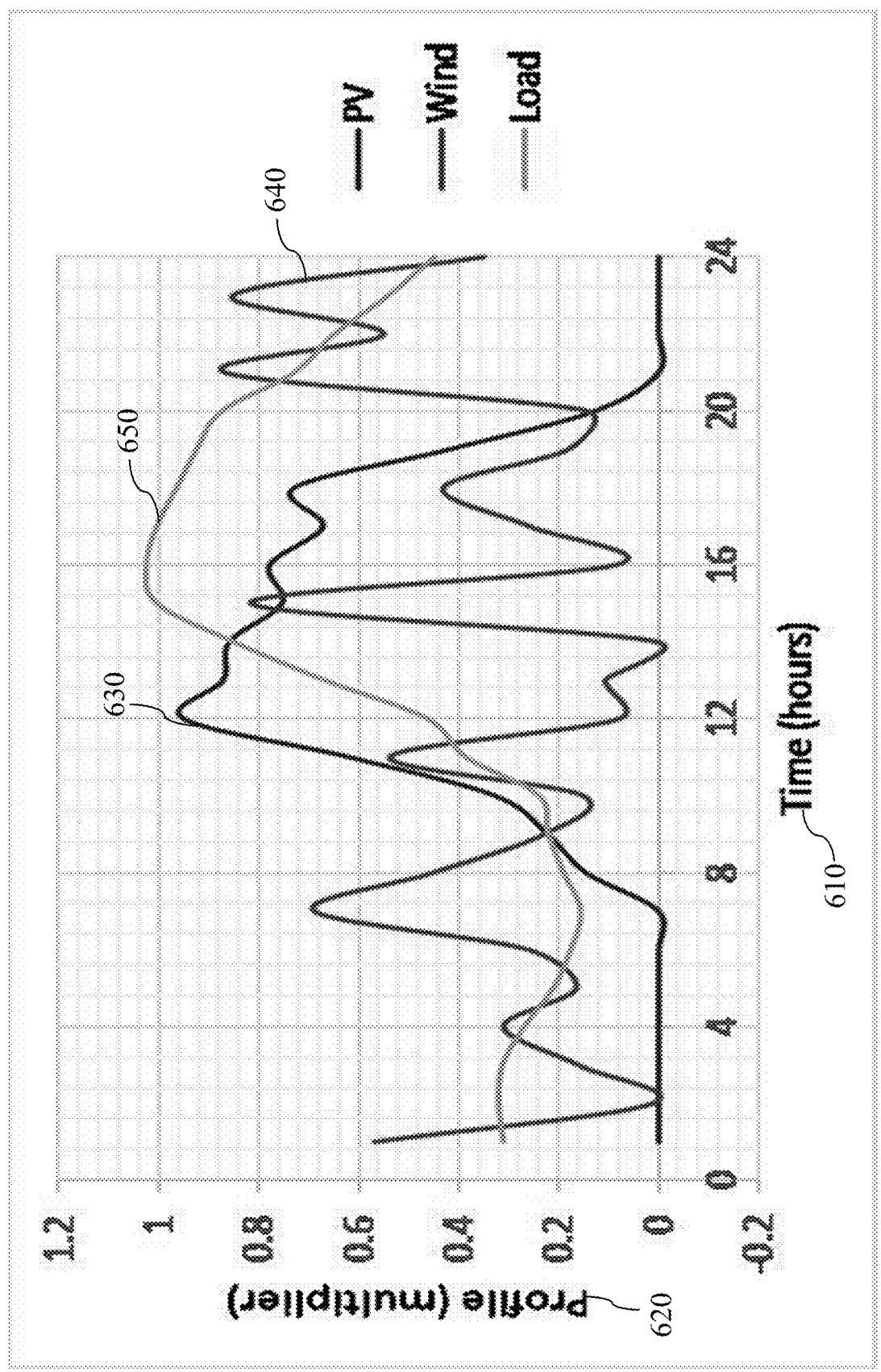
FIG. 6 is a schematic illustrating a daily profile of load and intermittent distributed generators modeling uncertainties, according to embodiments of the present disclosure.

FIG. 6 shows the load profile and predicted DG (solar and wind) outputs with assumed multipliers where the multipliers are used to make the load and generation profile change with time. The horizontal and vertical axes represent the hours of the day, 610 and the values of related profile, 620. The load profile 650, PV and wind generation profiles, 630 and 640 are expressed in term of multipliers with respect to base values. The output of a renewable DG is simply the product of its capacity and multipliers in FIG. 6. For simplicity, it is assumed that all loads have the same multiplier. However, various multipliers can be used for different nodes. The key point is to obtain the adjustable output of dispatchable DGs and perform necessary load-shedding while utilizing the given loading, renewable generation, and storage system.

Nodes 195, 251, and 451 are equipped with MTs with maximum capacity as 202.35 kW, 220.65 kW, and 210.21 kW, respectively. The minimum active/reactive capacities are set to be zero for all MTs. Each SSIG will have one master control unit located at a dispatchable DG (MT) where the control strategy is a single master operation mode (SMO). The WTs are located at nodes 18, 50, 74, 92, and 152 with maximum capacity of 60 kW, 30 kW, 45 kW, 60 kW and 36 kW. The PVs are located at nodes 23, 38, 112 with maximum capacity of 30 kW, 30 kW and 60 kW.

Three storage devices are connected to nodes 8, 99, and 87 through a bidirectional AC/DC converter. For each ESS, its rated capacity is 200 kWh, its minimal SOC and maximal SOC are 0 and 0.9, its charging/discharging efficiency is 95%, and maximum charging/discharging capacity equals to its half of maximum capacity. The initial SOCs are 0.3, 0.55 and 0.42 for ESSs at nodes 8, 99, and 87 respectively. The maximum capacities for ESSs at nodes 8, 99, and 87 are 60 kW, 72 kW, and 120 kW, respectively.

To demonstrate the effectiveness of the disclosed method in restoration during an extreme event, several random faults within the exemplar system in FIG. 3 are generated in addition to the substation fault. As the damage scenarios in a distribution network during an extreme event is unpredictable, several scenarios are created to mimic different severity of damages in a disaster condition. Five different scenarios are simulated where the number of random faults is 2, 5, 10, 15, and 20.

Figure 7:
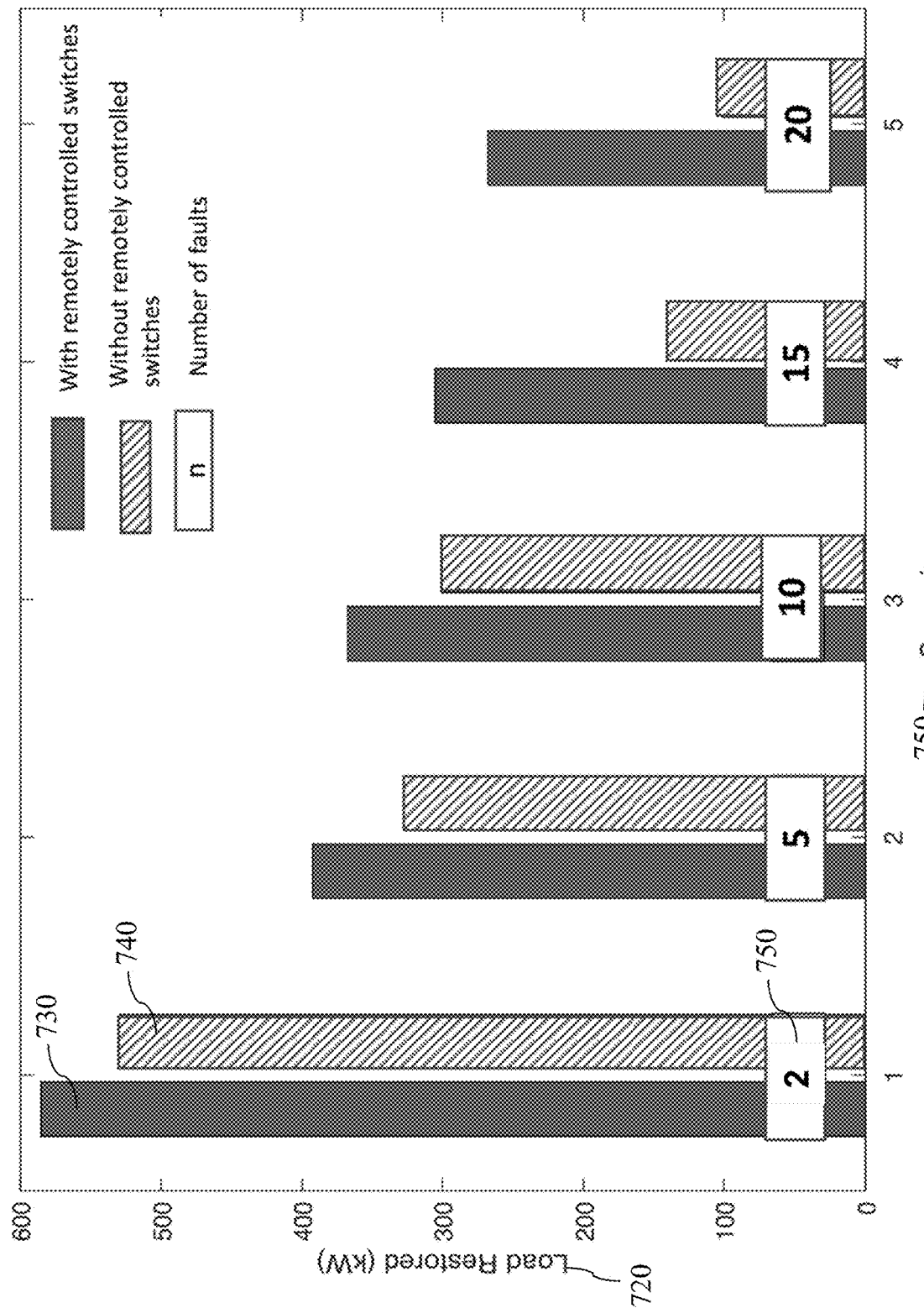
FIG. 7 is a schematic illustrating total loads picked up for several damage scenarios for a snap shot solution, according to embodiments of the present disclosure.

FIG. 7 shows the weighted load restored for each of the randomly generated faults for a particular time. The horizontal and vertical axes represent the fault scenarios and amounts of restored loads, 710 and 720, respectively. The plots 730, and 740 represent the scenarios for with and without remotely controlled switches, respectively, and the plots 750 represents the number of faulted lines. It is observed that the ability of DGs to provide service is degraded with the increase in physical damage to the distribution network components (lines, switches, transformers, etc.). On the other hand, for a given damage scenario, well-placed tie switches enhance the system resilience by picking up more critical loads. This results thus demonstrate that the network performance is improved in post-disaster condition using distributed generators and optimally placed remote controlled switches.

Now, the aforementioned environment of natural disaster as shown FIG. 3 is simulated to test how the proposed method coordinates several dispatchable and non-dispatchable generations for the chosen optimization horizon. The three MTs located at distribution network forms three different SSIGs by picking maximum critical and few non-critical loads in coordination with other non-dispatchable DGs and ESS. So, the first task is to form three SSIGs where each of them is energized by a single MT. After three isolated areas are formed, each isolated area works independently managing their own critical loads and generation.

Figure 8:
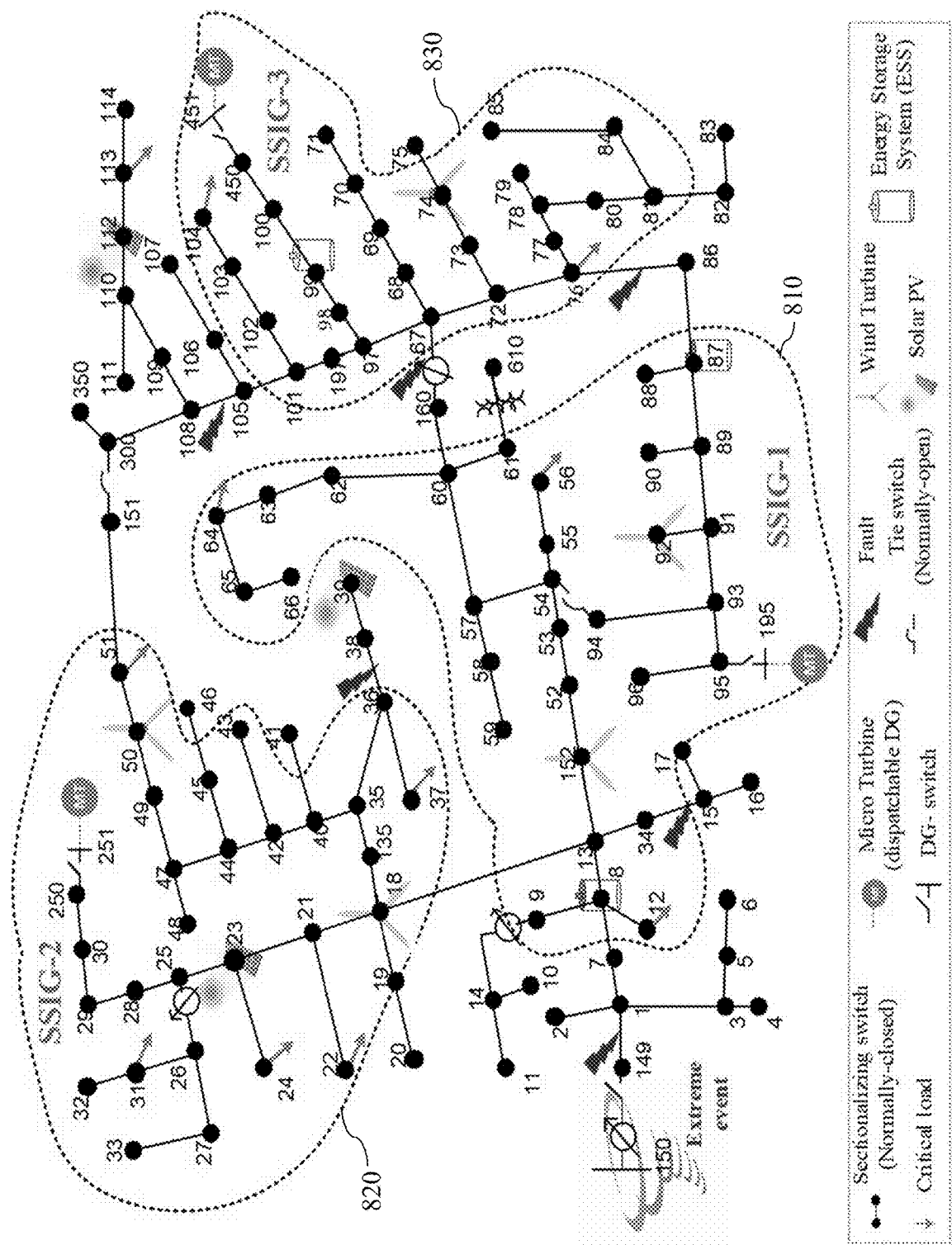
FIG. 8 is a schematic illustrating three self-sustained islanded grids (SSIGs) formed from three micro-turbines (MTs) and coordination of several intermittent distributed generators (DGs) and energy storage systems (ESSs), according to embodiments of the present disclosure.

FIG. 8 shows three SSIGs formed by switching off the corresponding edges to form a minimum spanning forest, including SSIG-1 810, SSIG-2 820 and SSIG-3 830. Each SSIG is a connected graph having different generation sources and are independent spanning trees of the forest. Note that islanding scheme is done only once before picking up the loads. After forming islands, once each of them is energized and start restoring the service to critical loads, only load switches and dispatchable DGs are controlled within each isolated area.

Finally, each isolated area has its own generation sources and loads to pick up. Based on renewable generation and load profile for a particular day, optimization is done for given time interval. It is assumed that the renewable generation and load profiles follow the similar trend as shown in FIG. 6 for the number of days a disaster is lasting. This simply means the optimization solution for a particular day ($T^H$) is repeated for next successive days until damaged infrastructures are fully recovered and utility comes back.

Figure 9:
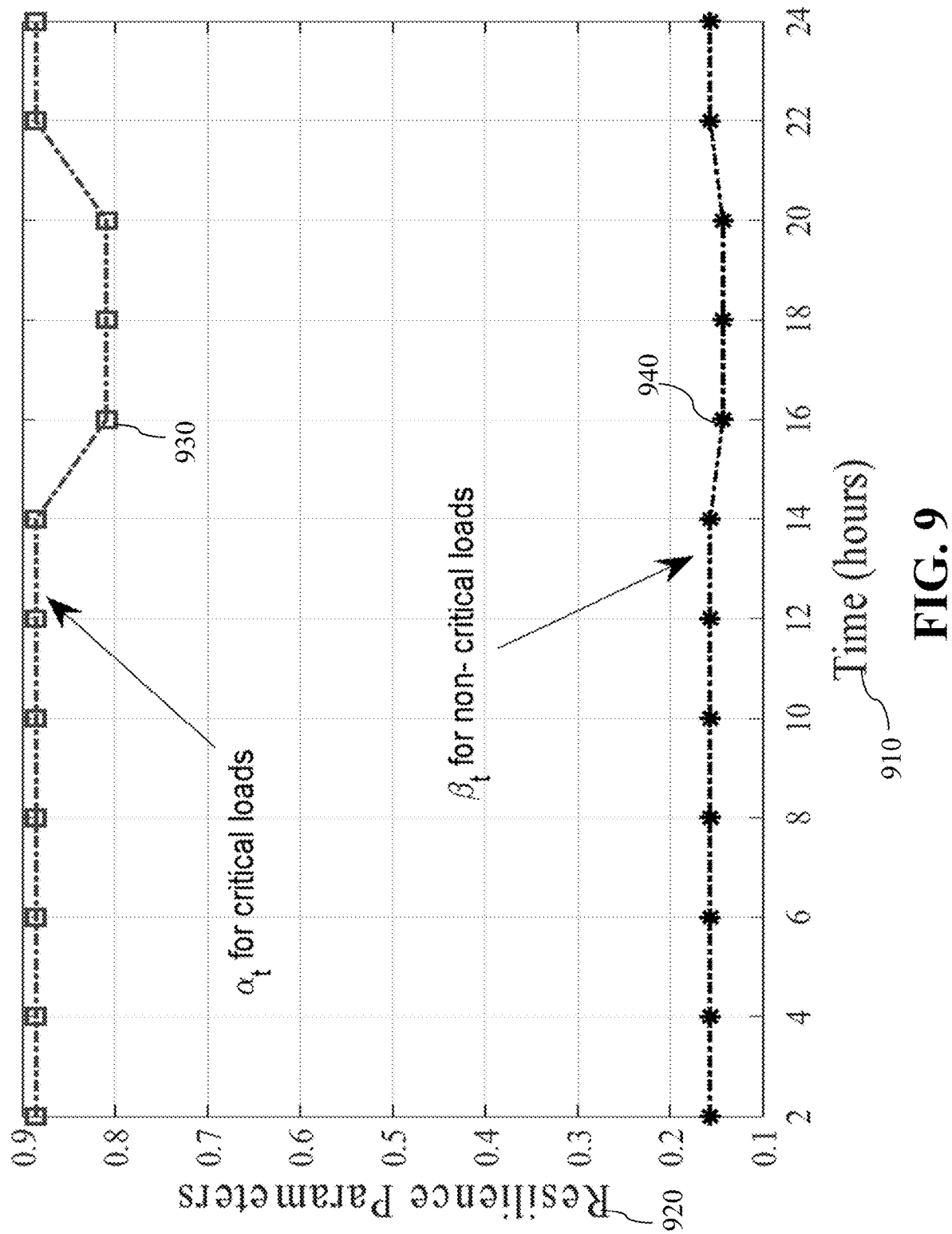
FIG. 9 is a schematic illustrating resilience parameters (a,13) for different time period, according to embodiments of the present disclosure.

FIG. 9 shows the resilience parameters 920 for a particular day 910. It is observed that pre-specified resilience criteria are met and during peak load period, parameters α and β, 930 and 940 reduces slightly implying few loads are switched off to meet the available generation.

Figure 10:
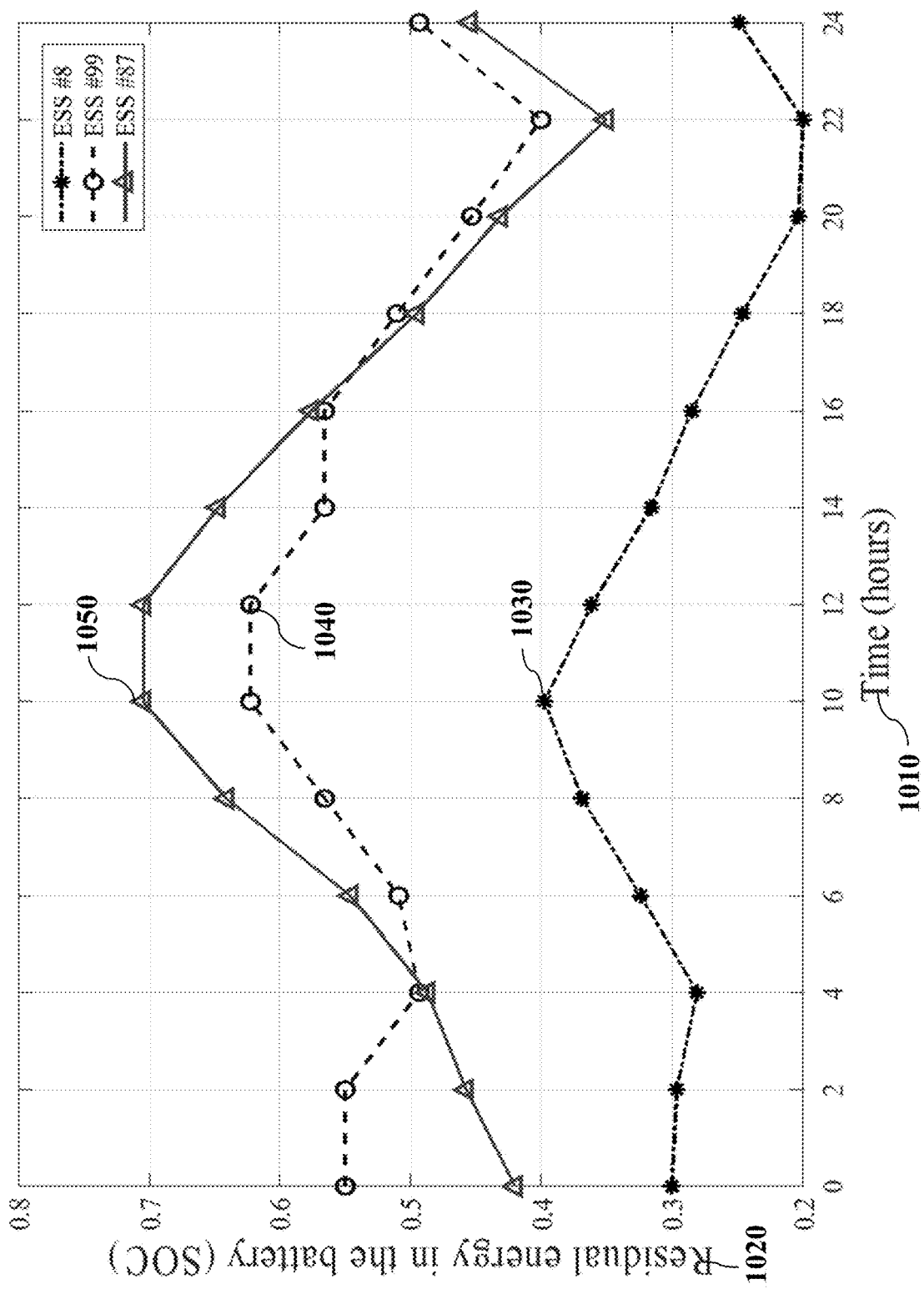
FIG. 10 is a schematic illustrating the state of charge (SOC) of three batteries with two-hour intervals, according to embodiments of the present disclosure.

The ESS response is illustrated graphically in FIG. 10 where each ESS goes into charging and discharging mode. The horizontal and vertical axes represent the hour of the day, 1010 and the residual energy in the battery, 1020, respectively. The SOCs variation over time for three different ESSs are shown in plots 1030, 1040 and 1050 respectively. It is clearly observed that ESS charges itself during the early period (less loading) and discharge itself during the peak load period.

Figure 11:
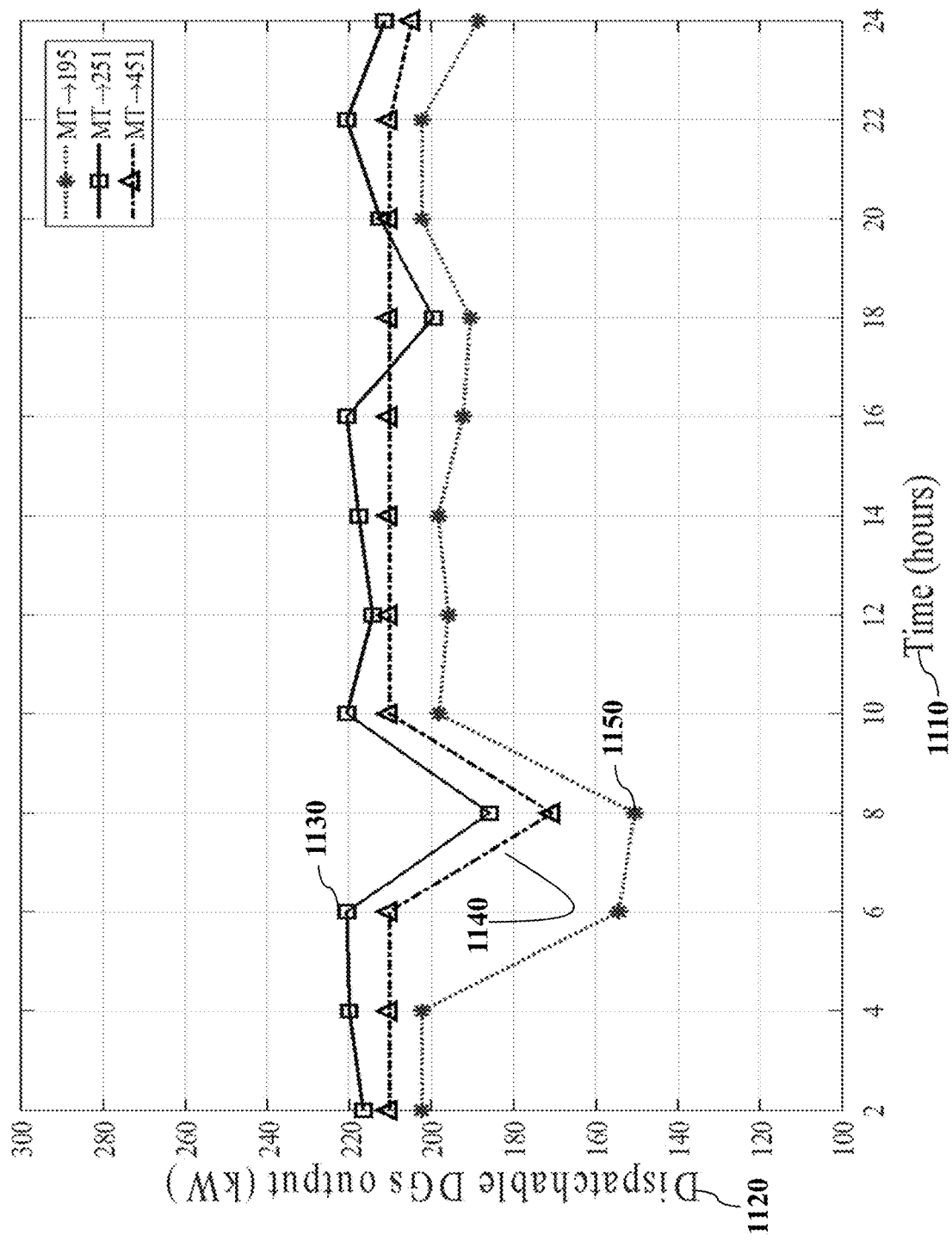
FIG. 11 is a schematic illustrating output from microturbines (MT) for balancing varying loads and intermittent distributed generators (DGs), according to embodiments of the present disclosure.

Similarly, the generation dispatches (kW) of MTs in the restoration period is shown in FIG. 11 to balance the varying load and intermittent DGs at each time interval. In FIG. 11, the horizontal and vertical axes represent the hour of the day, 1110 and the outputs of dispatchable DGs, 1120. The DGs output variation over time for three different MTs are shown in plots 1130, 1140 and 1150, respectively. Thus, the overall resilience is achieved for a given time horizon with different loading conditions.

Features

According to aspects of the present disclosure, the current condition information can include energized status, damage/disconnected status, terminal voltages, and power flows, such that the devices are communicatively linked to the information network. At least one advantage of having the current information is to save time in detecting the disruptive power condition, so that a response can be quickly addressed. Another aspect is that the devices in the PDG can include substations, inter-bus links, power sources, loads, and switches. Further, another aspect can be that the information network is one of a wide area network, the Internet or both.

Another aspect of the present disclosure can include the one or more computing devices being communicatively linked to access a hardware memory, the hardware memory includes program instructions and historical data. Wherein the historical data includes PDG data including a topology of the PDG that incorporates identifying locations of the micro-grids and the one or more loads, along with labeling the one or more loads as the subset of critical loads and the subset of non-critical loads. At least one advantage includes of using the historical data is reducing computation resources and an amount of computation time, in implementing the methods and systems of the present disclosure. Further, use of the historical data can ensure timely solution when some data are missing but can be estimated from history.

Another aspect of the present disclosure can include the forming of the MSF by finding an optimal set of independent radial-configured connected graphs, wherein each graph includes a power source with black start capability as its root, and a set of healthy inter-bus links as its edges, and its topology connectivity is optimized by minimizing a weighted sum of total un-restored critical and non-critical loads for all connected buses, and a sum of total vulnerability rankings for all connected inter-bus links. Some advantages of forming the MSF can include saving an amount of computation time and computation resources, ensuring the physical survivability of the islanded grid in the post-restorative state until the infrastructures are fully recovered, meet the resilience criteria during the disaster period based on utilizing the concept of MSF. Further advantages can include that the tie switches can be effectively modeled in a problem formulation of the unbalanced three-phase distribution network and their effects on forming the MSF can be detailed. Further, the uncertain behavior of load consumption and power output from intermittent DGs can be modeled for providing solutions in a given optimization horizon. Further still, a mixed-integer linear program (MILP) can be developed by transforming the combinatorial problem of path search which can be efficiently and quickly solved by off-the-shelf solvers.

It is possible that an aspect of the SSIMG network is an independent operated radial-configured network, wherein the network includes at least a dispatchable power source, a set of non-dispatchable power sources, and a set of energy storage systems to ascertain power balance for a pre-determined period of time with critical loads and non-critical loads to be picked up.

Another aspect can include the rank assigning to each inter-bus link within each micro-grid represents its vulnerability to future extreme events and is determined based on multiple factors, including its exposure to vegetation, span length, location and supporting structures. At least one advantage of the rank assigning of each inter-bus link within each micro-grid can be ensuring the physical survivability of the islanded grid in the post-restorative state until the infrastructures are fully recovered.

Another aspect of the present disclosure is assigning the ranking to each inter-bus link within each micro-grid is according to one or more constraints, which helps in identifying some inter-bus links above a high-ranking threshold to be switched off during the restoration period but not violated any feasibility constraints such as power balance, voltage allowed ranges and radial topology. The one or more constraints can include connectivity constraints for bus energization, load pick up, switch energization and radial topology, power source capacity and storage residual energy constraints, power balance and voltage constraints using three-phase linearized power flow, to name a few. Some advantages in using the constraints can be assisting in the physical survivability of the islanded grid in the post-restorative state until the infrastructures are fully recovered, assist in meeting the resilience criteria during the disaster period based on assisting with the concept of MSF. Other advantages can include in identifying some of the tie-switches that can be implementable. Still further advantages include that a feasible but robust network can be created for restoration by minimizing the ranked sum of the inter-bus links to enhance the capability of the restored network withstanding future shock or second strike of a disaster.

Another aspect of the present disclosure is the inter-bus links above the high-ranking threshold can be switched off during the restoration period through remotely controlling the statuses of switches on the inter-bus links. At least one advantage can be ensuring the physical survivability of the islanded grid in the post-restorative state until the infrastructures are fully recovered, along with meeting the resilience criteria during the disaster period.

Another aspect of the present disclosure is that the different forest configurations of the switches can be formed by adjusting the switch statuses of remotely controlled load switches and line switches. At least one advantage of exploring different forest configurations is obtaining more resilient network without scarification the total amount of load restored.

Another aspect of the present disclosure is the determining the buses that are switched on is implemented by choosing a set of bus combination that maximizes a weighted sum of restored critical loads and restored non-critical loads. At least one advantage of exploring different bus combination is maximally utilizing the available resources for restoring services for the critical loads and non-critical loads according to priority.

Another aspect of the present disclosure is determining a configuration of the power distribution grid into micro-grids, the micro-grid can include one or more premises. It is possible that a micro-grid may include some premises that, in combination, produce enough power to be consumed within some of the premises. The micro-grid may be created via an operator by opening switches in the power distribution grid that electrically isolate the premises within an area of the power distribution grid from the rest of the power distribution grid. For example, the number of micro-grids may be reduced to the number of connected premises and/or consuming devices within the micro-grid, based on verifying of a disruptive power condition or possibly due to current conditions leading to a disruptive power condition, which may include one of, a particular weather condition, load demands/concerns, power generation, etc., within the distribution grid.

Aspect of the present disclosure can further include electrically isolating the micro-grid from the power distribution grid, using, by-non-limiting example, program instructions stored on the at least one or more computer-readable storage mediums, that can control switching elements in the power distribution grid to electrically isolate the one or more premises from the power distribution grid.

Aspect of the present disclosure can further include the plurality of power sources including micro-turbines, such that each micro-grid in the subset of micro-grids includes a micro-turbine. Wherein each micro-grid in the subset of micro-grids includes the micro-turbine and at least one power source, such as a solar power source, wind power source, an another type of renewable power source and an energy storage device such as a flywheel energy storage system.

Aspect of the present disclosure can further include each spanning tree in a forest is configured to be a micro-grid that is a self-sustained islanded micro-grid (SSIMG) network. Wherein a ranked sum of the inter-bus links is minimized in each micro-grid in the set of micro-grids. Wherein the subset of micro-grids from the set of micro-grids that are less susceptible for inter-bus link failures in the restoration period.

Aspects of embodiments of present disclosure provide other contributions and benefits in addressing the resilience restoration challenges during a disaster period of a power distribution system. For example, some advantage aspects of some embodiments of the present disclosure can include: using a minimum spanning forest (MSF) to meet the resilience or physical survivability criteria during disaster period; optimally placing tie switches and locally available distributed generators (DG) with other energy systems (i.e. renewable energy & energy storage systems), so each isolated area works independently, managing their own critical loads and generation, while still achieving the resilience objectives; as well as addressing the uncertain behavior of load consumption and power output from renewable energy (solar & wind) and energy storage systems, which can be modeled for providing a solution for each isolated area having its own given optimization horizon.

Figure 12:
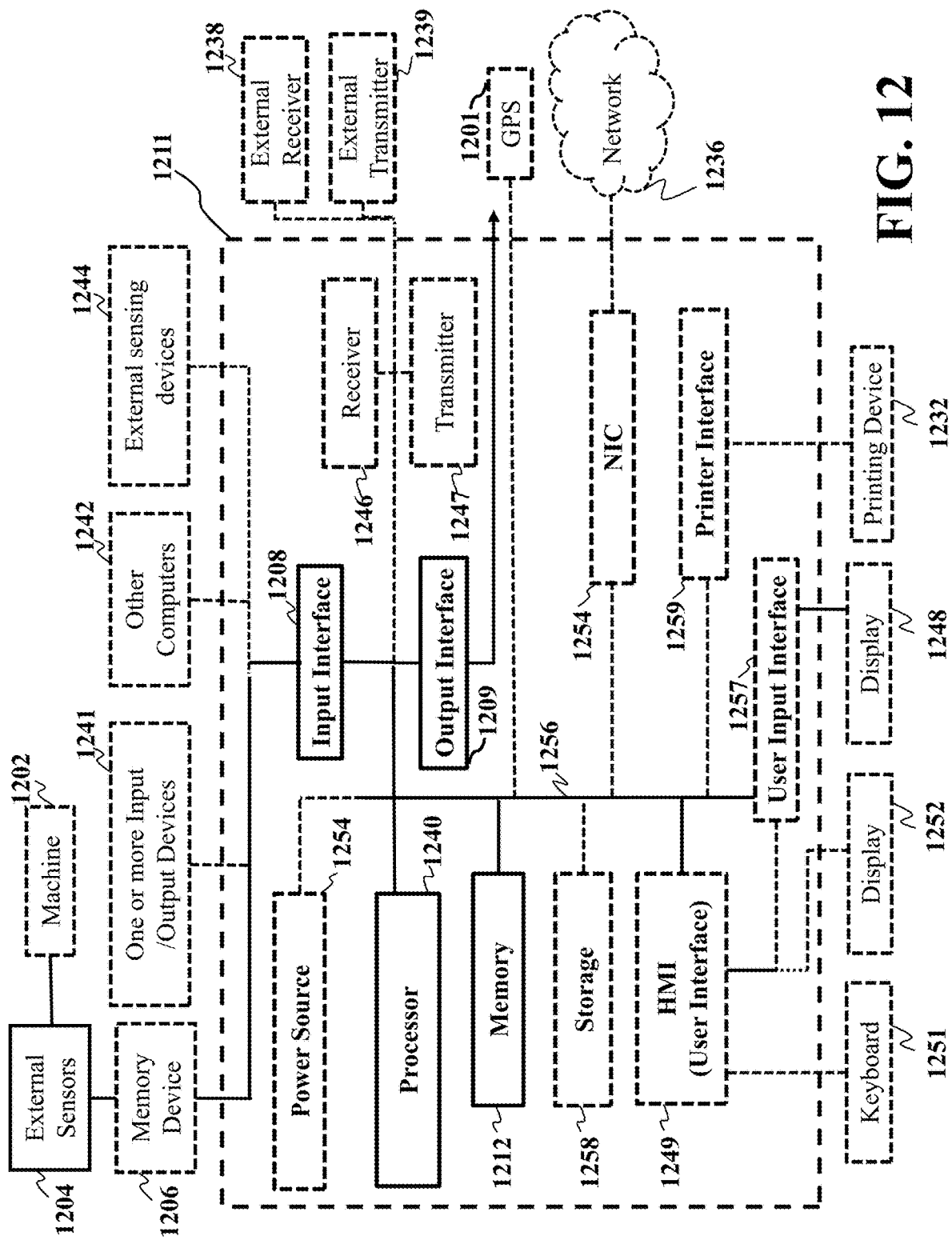
FIG. 12 is a block diagram illustrating the methods of FIG. 1A and FIG. 1B, that can be implemented using an alternate computer or processor, according to embodiments of the present disclosure.

FIG. 12 is a block diagram of illustrating the method of FIG. 1A, that can be implemented using an alternate computer or hardware processor, according to embodiments of the present disclosure. The computer 1211 includes a hardware processor 1240, computer readable memory 1212, storage 1258 and user interface 1249 with display 1252 and keyboard 1251, which are connected through bus 1256. For example, the user interface 1264 in communication with the hardware processor 1240 and the computer readable memory 1212, acquires and stores the signal data examples in the computer readable memory 1212 upon receiving an input from a surface, keyboard surface 1264, of the user interface 1264 by a user.

The computer 1211 can include a power source 1254, depending upon the application the power source 1254 may be optionally located outside of the computer 1211. Linked through bus 1256 can be a user input interface 1257 adapted to connect to a display device 1248, wherein the display device 1248 can include a computer monitor, camera, television, projector, or mobile device, among others. A printer interface 1259 can also be connected through bus 1256 and adapted to connect to a printing device 1232, wherein the printing device 1232 can include a liquid inkjet printer, solid ink printer, large-scale commercial printer, thermal printer, UV printer, or dye-sublimation printer, among others. A network interface controller (NIC) 1234 is adapted to connect through the bus 1256 to a network 1236, wherein time series data or other data, among other things, can be rendered on a third-party display device, third-party imaging device, and/or third-party printing device outside of the computer 1211.

Still referring to FIG. 12, the signal data or other data, among other things, can be transmitted over a communication channel of the network 1236, and/or stored within the storage system 1258 for storage and/or further processing. Contemplated is that the signal data could be initially stored in an external memory and later acquired by the hardware processor to be processed or store the signal data in the hardware processor's memory to be processed at some later time. The hardware processor memory includes stored executable programs executable by the hardware processor or a computer for performing the resilient restoration systems/methods, power distribution system operation data, and historical power distribution system data of the same type as the power distribution system and other data relating to the resilient restoration of the power distribution system or similar types of power distribution system s as the power distribution system.

Further, the signal data or other data may be received wirelessly or hard wired from a receiver 1246 (or external receiver 1238) or transmitted via a transmitter 1247 (or external transmitter 1239) wirelessly or hard wired, the receiver 1246 and transmitter 1247 are both connected through the bus 1256. The computer 1211 may be connected via an input interface 1208 to external sensing devices 1244 and external input/output devices 1241. For example, the external sensing devices 1244 may include sensors gathering data before-during-after of the collected signal data of the power distribution system. For instance, the disaster induced faulted line segments, and faulted types, and the fault impacted customers. The computer 1211 may be connected to other external computers 1242. An output interface 1209 may be used to output the processed data from the hardware processor 1240. It is noted that a user interface 1249 in communication with the hardware processor 1240 and the non-transitory computer readable storage medium 1212, acquires and stores the region data in the non-transitory computer readable storage medium 1212 upon receiving an input from a surface 1252 of the user interface 1249 by a user.

Definitions

Power grid and electrical grid, reference a same definition, in this application. A power grid is an interconnected network for delivering electricity from one location to another location, such as from a power producer to a power consumer. The power grid can consist of generating stations that produce electrical power, high voltage transmission lines that carry power from distant sources to demand centers, and distribution lines that connect to consumers of the power, such as customers. For example, a power grid or distribution grid may include one or more premises, such as homes, businesses or facilities, including devices that consume electricity or power, and energy resources that provide electricity or power such as generators and renewable energies.

Micro-grid or micro-grids can be a localized group of electricity sources and loads that normally operates connected to and synchronous with the traditional wide area synchronous grid (main-grid, or macro-grid), but can also disconnect to "island mode", i.e. micro-grids can be structured to be unnetworked from the power distribution network during a restoration period, and function autonomously as physical or economic conditions dictate. In this way, a micro-grid can effectively integrate various sources of distributed generation (DG), especially Renewable Energy Sources (RES), renewable electricity, and can supply emergency power, changing between island and connected modes. For example, a micro-grid can be capable of operating in grid-connected and stand-alone modes and of handling the transition between the two. In the grid-connected mode, ancillary services can be provided by trading activity between the micro-grid and the main grid. Other possible revenue streams exist. In the islanded mode, the real and reactive power generated within the micro-grid, including that provided by the energy storage system, should be in balance with the demand of local load.

Further, a micro-grid may transition between these two modes because of scheduled maintenance, degraded power quality or a shortage in the host grid, faults in the local grid, or for economic reasons. By means of modifying energy flow through micro-grid components, micro-grids facilitate the integration of renewable energy generation such as photovoltaic, wind and fuel cell generations without requiring re-design of the national distribution system. Modern optimization methods can also be incorporated into the micro-grid energy management system to improve efficiency, economics, and resiliency.

Self-sustained islanded micro-grid (SSIMG) is defined as a micro-grid operated in the islanded mode, and having sufficient generation capacity to maintain power balance for a given length of time period to withstand the load and renewable generation variations. The generation capacity and mix in the micro-grid have to be sufficient and flexible enough to maintain the frequency and voltage stabilities before the utility grid is able to re-connected.

Power sources can include distribution generators, micro-turbines, renewable energies (solar, wind, tidal, etc.), stored energy and the like.

Critical loads can require a substantially continuous supply of power and are thus deemed "critical loads". Examples of some critical loads include computers, control devices employing computers, and/or electronic data processing devices. In regard to the critical loads and continuous supply of power, mere brief interruptions in a standardized supply of electric power by the utility grid may cause, for example, a computer to malfunction, which sometimes can be costly, as well as substantial consequences.

Non-critical loads can be defined as all loads which are not labeled as critical loads. Non-critical loads usually do not require a substantially continuous supply of power and can be shed off if there is a generation shortage, or restored after the critical loads are restored.

Resilient restoration is targeted to provide restoration schemes that can maintain grid's physical survivability for a period of time after the restoration scheme is implemented until after the infrastructures are fully recovered.

Operational resilience can be defined as the ability of power distribution systems as a whole to absorb and adapt to disasters, rather than contribute to them. It goes beyond traditional operational risk and recovery capabilities, with a focus on preserving the continuity of the provision of "critical functions" to both the distribution system and to the system's customers.

Resiliency state can be considered a period of time prior to an extreme event that the grid has sufficient resilience as designed.

Event is considered some action that caused damage to at least a portion of the power grid, resulting in a potential of, a destabilization of or loss of, power in the power distribution network, which causes an interruption of supplying continuous power either immediately or sometime in a near future. Some examples of events may be considered as natural disaster event (weather, earthquake, etc.), an intentional damaging event (terrorist attack, etc.) or an unintentional damaging event (plane crash, train wreck, etc.).

Post event degraded state can be considered a period of time after the extreme event occurs, but prior to that restorative measures are taken, where the grid is damaged with least resilience for future events.

Restorative state can be considered a period of time after the extreme events occurred and associated restorative measures are taking into actions. The resilience of the grid is gradually increased from the level at degraded state. The restorative measures are designed to bring the power distribution system back to normal service after an extreme event occurs.

Post-restorative state can be considered as a period of time after the restorative measures are fully implemented but the infrastructure has not been fully recovered to normal yet.

Infrastructure resilience refers to the resilience of hardware, such as power towers, substation structure, and power wires.

Infrastructure recovery refers to the recovery of damaged hardware, such as power towers, substation structure, and power wires.

Information network is one of a wide area network, the Internet or both.

Condition information from devices may include device energized status, device damage/disconnected status, terminal voltages, and power flows. For example, a current condition information received from the devices can be updated condition information for that moment in time the condition information is received or obtained.

Historical data refers to the power distribution grid data acquired before the extreme event occurs.

Power distribution grid data can include a topology of the power distribution grid that incorporates identifying locations of the micro-grids and the one or more loads, along with labeling the one or more loads as the subset of critical loads and the subset of non-critical loads.

Premises or locations may be a residential home, a commercial business, facility within a power distribution grid that may operate their own energy resources such as renewable energies, i.e. solar cells, wind turbines, and batteries, that can also provide power to the power distribution grid. The residential home, commercial business or facility, each include devices that consume electricity or power, via devices that operate using electricity or power.

Buses can be a bus powered by electric energy, a bus used for connecting components of electrical devices such as a computer or communications between computers. A bus that is switched-on is understood there is an operational link between two buses for power or communication and the like to operate, whereas a bus that is switched-off is understood that there is no operational link between two buses.

Inter-bus link failures can be understood as an operational link between two buses is failed, such as a communication link failure, a power wire down or broken, a power wire short-circuited, and a switch malfunction.

Ranking thresholds for inter-bus links includes a lowest ranked inter-bus link is defined as an inter-bus link having a very high probability of continually operating during an event, and a highest ranked inter-bus link is defined as an inter-bus link having a very high probability of not operating during the same event.

Power disruption can be a power outage or power failures in the power distribution network. Examples of some causes of power failures can include faults at power stations, damage to electric transmission lines, substations or other parts of the distribution system, a short circuit, or the overloading of electricity mains. Specifically, a power outage can be a short or long-term state of electric power loss in a given area or section of a power grid, that could affect a single house, building or an entire city, depending on the extent of the damage or cause of the outage.

Power loads can be an electrical load is an electrical component or portion of a circuit that consumes (active) electric power. This is opposed to a power source, such as a battery or generator, which produces power. In electric power circuits examples of loads are appliances and lights.

Forming a MSF can be achieved through using a spanning tree algorithm with constraint checks, or by converting into a mixed integer linear programming problem. Using the spanning tree algorithm, we first create a virtual super-root for the forest, and add the virtual links between the super-root to each tree's root in the forest into the selected edge list of the MSF. Then choose the minimum weight edge or one of the minimum weight edges, among remaining unselected edges which would not create a cycle and add it to the selected list. Repeat the choosing until a set of minimal spanning trees represented by the selected edges is obtained. The selected forest is checked against the required constraints to determine if the selected one is feasible and if another spanning tree search is needed using different edge combination. The spanning tree search is a combinational problem, and is very time consuming for larger systems.

Another approach as we presented in present disclosure is converting the forming the MSF as a mixed integer linear programming problem (MILP), in which each node and each edge are related a binary decision variable, and the variable sets as one when the corresponding node or edge is selected. The feasibility requirements for the MSF such as radial connectivity configuration of the graphs is considered as constraint in the formulated MILP problem. The minimization of sum of weights for edges is taken as the objective function in the MILP formulation. After an optimal solution for the MILP problem is obtained, the nodes and edges which corresponding decision variables determined as ones constitute the final configuration of the MSF.

In a restoration problem, a distribution network represented as a graph is divided into several sub-graphs by switching off the edges where each sub-graph is a self-sustained islanded grid supplied by a DG. The required switching actions for dividing the network into sub-graphs, such as opening sectionalizing switches and closing tie switches, are given by the final solution the above-mentioned MILP problem. Meanwhile proper switching scheme for switching off edges with higher vulnerable weights that enables each sub-graph with minimum weight sum are also determined according to the MILP solution. After completing the required switch actions dictated by the determined MSF, a set of robust micro-grids are formed and each micro-grid is less vulnerable to disaster condition.

Ranking each inter-bus link within each micro-grid is determined by multiple factors, including its exposure to vegetation, span length, location and supporting structures. For example, the vulnerability weight for an inter-bus link between two nodes is a weighted combination of link weight and terminal bus weights, wherein the link weight is related to the link length, power wire configuration, supporting tower/pole venerability, and surrounding impacts such as exposes to vegetation; wherein the bus weight is determined based on the structure and location of the substation corresponding to the bus, such as substation foundation level, and the disaster risk for the substation location.

Identify switches that restore power to some critical loads of the subset of critical loads with different forest configurations, is determined by finding switches located on the valid paths between the microturbines and critical loads that require status change in order to energize the critical loads, and different combinations may be explored for maximizing the restored loads through more resilient paths. That is also including determining a switching sequence to maintain power balance between available generations and loads to be picked up during the load picking-up process. This task is implemented and included into one-time MILP solution with other tasks in present disclosure.

Activating switches to restore some power to the PDG is by sending a closing/opening signal from the DCS to the identified remotely controlled switch according to the determined switching sequence. After received the instruction, the switch will automatically execute the instructed operation, and update DCS when the operation is completed.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A system for configuring micro-grids to restore some power in a power distribution grid (PDG) in response to a power disruption over the PDG, the PDG includes power sources and a set of loads connected to buses, such that the set of loads includes a subset of critical loads and a subset of non-critical loads, and that the micro-grids are structured to be unnetworked during a restoration period, the system comprising:
   a computing hardware system comprising one or more computing devices communicatively linked to the PDG via an information network, wherein the one or more computing devices are configured to
   receive current condition information from devices in the PDG via the information network;
   form a minimum spanning forest (MSF) to identify a set of micro-grids, wherein each spanning tree in a forest is configured to be a micro-grid that is a self-sustained islanded micro-grid (SSIMG) network;
   assign a ranking to each inter-bus link within each micro-grid according to one or more constraints, to identify some inter-bus links above a high-ranking threshold to be switched off during the restoration period; and
   identify switches that restore power to some critical loads of the subset of critical loads with different forest configurations, based on buses that are switched on, to determine a subset of micro-grids less susceptible for link failures during the restoration period, and upon receiving an updated condition from the devices, activate the switches to restore some power to the PDG.

2. The system of claim 1, wherein the current condition information includes energized status, damage/disconnected status, terminal voltages, and branch power flows, such that the devices are communicatively linked to the information network.

3. The system of claim 1, wherein the devices in the PDG include substations, inter-bus links, power sources, loads, and switches.

4. The system of claim 1, wherein the information network is one of a wide area network, the Internet or both.

5. The system of claim 1, wherein the one or more computing devices are communicatively linked to access a hardware memory, the hardware memory includes program instructions and historical data.

6. The system of claim 5, wherein the historical data includes PDG data including a topology of the PDG that incorporates identifying locations of the micro-grids and the one or more loads, along with labeling the one or more loads as the subset of critical loads and the subset of non-critical loads.

7. The system of claim 1, wherein the forming of the MSF is by finding an optimal set of independent radial-configured connected graphs, wherein each graph includes a power source with black start capability as its root, and a set of healthy inter-bus links as its edges, and its topology connectivity is optimized by simultaneously minimizing a sum of total un-restored critical and non-critical loads for all connected buses, and a sum of total vulnerability rankings for all connected inter-bus links.

8. The system of claim 1, wherein the SSIMG network is an independent operated radial-configured network, wherein the network includes at least a dispatchable power source, a set of non-dispatchable power sources, and a set of energy storage systems to ascertain power balance for a period of time with critical loads and non-critical loads to be picked up.

9. The system of claim 1, wherein the rank assigning to each inter-bus link within each micro-grid represents its vulnerability to future extreme events and is determined based on multiple factors, including its exposure to vegetation, span length, location and supporting structures.

10. The system of claim 1, wherein the rank assigning to each inter-bus link within each micro-grid represents its vulnerability to future extreme events and is determined as a weighted sum of a link vulnerability and a terminal bus vulnerability; wherein the link vulnerability at least relates to span length, supporting tower/pole structure, and exposure to vegetation; wherein the terminal bus vulnerability is a sum of vulnerabilities of two terminal buses of the inter-bus link, and the vulnerability for each bus at least relates the structure and location of a substation corresponding to the bus.

11. The system of claim 1, wherein the one or more constraints include connectivity constraints for bus energization, load picking up, switch energization and radial topology, power source capacity and storage residual energy constraints, power balance and voltage constraints using three-phase power flows.

12. The system of claim 11, wherein three-phase power flows are linearized by using linear equations to model the relationships of three-phase power flows on equivalent series and shunt branches of an inter-bus link with three-phase voltages at terminal buses of the link.

13. The system of claim 1, wherein the ranked sum of the inter-bus links is minimized to enhance the capability of the restored network withstanding future shock or second strike of a disaster.

14. The system of claim 1, wherein the inter-bus links above the high-ranking threshold are switched off during the restoration period through remotely controlling the statuses of switches on the inter-bus links.

15. The system of claim 1, wherein the different forest configurations of the switches is formed by adjusting the switch statuses of remotely controlled load switches and line switches.

16. The system of claim 1, wherein the determining the buses that are switched on is implemented by choosing a set of bus combination that maximizes a weighted sum of restored critical loads and restored non-critical loads.

17. A method for configuring micro-grids to restore some power in a utility grid in response to a power disruption over the utility grid, the utility grid includes a plurality of power sources and a set of loads connected to buses, such that the set of loads includes a subset of critical loads and a subset of non-critical loads, and that the micro-grids are structured to be unnetworked during a restoration period, the method comprising:

monitoring condition information from devices in the utility grid via an information network;

using an executable program and historical data stored in a hardware memory, for forming a minimum spanning forest (MSF) to identify a set of micro-grids, wherein each spanning tree in a forest is configured to be a micro-grid that is a self-sustained islanded micro-grid network, when a power disruption condition is detected in the utility grid;

assigning a ranking to each inter-bus link within each micro-grid according to one or more constraints, to identify some inter-bus links above a high-ranking threshold to be switched off during the restoration period;

identifying switches that restore power to the subset of critical loads with different forest configurations based on buses that are switched on, to determine a subset of micro-grids less susceptible for inter-bus link failures during the restoration period;

receiving an updated condition of the utility grid that includes a power disruption condition from the devices;

initiating the stored executable program based on the power disruption condition to determine a subset of micro-grids less susceptible for inter-bus link failures during the restoration period; and activating the switches to restore some power to the utility grid using a computing device of one or more computing devices of a computing hardware system communicatively linked to the utility grid via the information network.

18. The method of claim 17, wherein the activating of each switch includes that each micro-grid operates independently from other micro-grids in the subset of micro-grids as well as the utility grid.

19. The method of claim 17, wherein the plurality of power sources includes micro-turbines, such that each micro-grid in the subset of micro-grids includes a micro-turbine.

20. The method of claim 19, wherein each micro-grid in the subset of micro-grids includes the micro-turbine and at least one power source.

21. A method for configuring micro-grids in an electrical distribution grid (EDG), to restore some power in the EDG in response to a power disruption over the EDG, the EDG includes a plurality of power sources and a set of loads connected to buses, such that the set of loads includes a subset of critical loads and a subset of non-critical loads, and that the micro-grids are structured to be unnetworked during a restoration period, the method comprising: providing a computer infrastructure, operable to:

subscribe to devices registered with a network server corresponding to the EDG;

receive current condition information published in messages by the devices via the network server;

determine whether a power disruption is present in the EDG, if the power disruption is determined, then access an executable program from a hardware memory that includes program instructions and historical data, the executable program is configured to form a minimum spanning forest (MSF) to identify a set of micro-grids;

assign a ranking to each inter-bus link within each micro-grid according to one or more constraints, wherein inter-bus links above a high ranking threshold are switched off during the restoration period;

identify switches that restore power to some critical loads of the subset of critical loads with different forest configurations, based on buses that are switched on, to determine a subset of micro-grids; and transmit messages to the identified switches to restore power to some of the critical loads.

22. The method of claim 21, wherein each spanning tree in a forest is configured to be a micro-grid that is a self-sustained islanded micro-grid (SSIMG) network, wherein a ranked sum of the inter-bus links is minimized in each micro-grid in the set of micro-grids; and wherein the subset of micro-grids from the set of micro-grids that are less susceptible for inter-bus link failures in the restoration period.

23. A computer program product for configuring micro-grids, the computer program product comprising:

one or more computer-readable storage mediums;

program instructions, stored on at least one of the one or more computer-readable storage mediums, to electrically isolate one or more premises into a micro-grid within a power distribution grid (PDG);

program instructions, stored on at least one of the one or more computer-readable storage mediums, to subscribe to devices in a local region network of the one or more premises; and program instructions, stored on at least one of the one or more computer-readable storage mediums, to modify power flow in the micro-grid based on current condition information identifying a power disruption provided from the devices via the local region network, wherein the computer program product is configured to receive the current condition information from the devices via the local region network;

form a minimum spanning forest (MSF) to identify a set of micro-grids, and each spanning tree in a forest is configured to be a micro-grid that is a self-sustained islanded micro-grid (SSIMG) network;

assign a ranking to each inter-bus link within each micro-grid according to one or more constraints, to identify some inter-bus links above a high-ranking threshold to be switched off during the restoration period; and identify switches that restore power to some critical loads of the subset of critical loads with different forest configurations, based on buses that are switched on, to determine a subset of micro-grids less susceptible for link failures during the restoration period, and upon receiving an updated condition from the devices, activate the switches to restore some power to the PDG.

24. The computer program product of claim 23, wherein the activating of the switches to restore some power to the PDG includes the energizing of each micro-grid of the subset of micro-grids less susceptible for link failures during the restoration period, and other energy systems of the PDG including renewable energy systems, energy storage systems, or both, so as to achieve a level of resiliency to future extreme events.

25. The computer program product of claim 23, wherein the rank assigning to each inter-bus link within each micro-grid represents a level of vulnerability to future extreme events and is determined as a weighted sum of a link vulnerability and a terminal bus vulnerability, wherein the link vulnerability at least relates to a level of vulnerability associated with an amount of span length between poles, an amount of a physical survivability of supporting tower/pole structure, and an amount of exposure to vegetation, wherein the terminal bus vulnerability is a sum of vulnerabilities of two terminal buses of the inter-bus link, and the vulnerability for each bus at least relates the structure and location of a substation corresponding to the bus.

* * * * *